United States Patent
Sindhu et al.

(10) Patent No.: US 9,100,323 B1
(45) Date of Patent: Aug. 4, 2015

(54) DEADLOCK-RESISTANT FABRIC TREE REPLICATION IN A NETWORK DEVICE

(71) Applicant: Juniper Networks, Inc., Sunnyvale, CA (US)

(72) Inventors: Pradeep Sindhu, Los Altos Hills, CA (US); Jean-Marc Frailong, Los Altos Hills, CA (US); Sarin Thomas, Sunnyvale, CA (US); Srihari Vegesna, San Jose, CA (US); David J. Ofelt, Los Gatos, CA (US); Chang-Hong Wu, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/101,019

(22) Filed: Dec. 9, 2013

Related U.S. Application Data

(63) Continuation of application No. 12/759,850, filed on Apr. 14, 2010, now Pat. No. 8,605,722.

(60) Provisional application No. 61/285,482, filed on Dec. 10, 2009.

(51) Int. Cl.
  *H04L 12/28* (2006.01)
  *H04L 12/761* (2013.01)
  *H04L 12/931* (2013.01)
  *H04L 12/861* (2013.01)

(52) U.S. Cl.
  CPC .............. *H04L 45/16* (2013.01); *H04L 49/201* (2013.01); *H04L 49/90* (2013.01)

(58) Field of Classification Search
  CPC ........ H04L 45/16; H04L 49/201; H04L 49/90
  USPC .................................................. 370/390, 432
  See application file for complete search history.

(56) References Cited

U.S. PATENT DOCUMENTS 6,826,354 B2 * 11/2004 Tezuka ......................... 382/218
7,263,099 B1    8/2007 Woo et al.

(Continued)

OTHER PUBLICATIONS

Cain et al., RFC 3376, "Internet Group Management Protocol, Version 3," Network Working Group, the Internet Engineering Task Force proposed standard, Oct. 2002, available at http://tools.ietf.org/html/rfc3376, 54 pp.

(Continued)

*Primary Examiner* — Ayaz R. Sheikh
*Assistant Examiner* — Mounir Moutaouakil
(74) *Attorney, Agent, or Firm* — Shumaker & Sieffert, P.A.

(57) ABSTRACT

In general, the invention is directed to techniques for reducing deadlocks that may arise when performing fabric replication. For example, as described herein, a network device includes packet replicators that each comprises a plurality of resource partitions. A replication data structure for a packet received by the network device includes packet replicator nodes that are arranged hierarchically to occupy one or more levels of the replication data structure. Each of the resource partitions in each of the plurality of packet replicators is associated with a different level of the replication data structure. The packet replicators replicate the packet according to the replication data structure, and each of the packet replicators handles the packet using the one of the resource partitions of the packet replicator that is associated with the level of the replication data structure occupied by the node that corresponds to that particular packet replicator.

22 Claims, 7 Drawing Sheets

(56) References Cited

U.S. PATENT DOCUMENTS

| | | |
|---|---|---|
| 7,420,972 B1 | 9/2008 | Woo et al. |
| 7,474,672 B2 | 1/2009 | Barri et al. |
| 7,715,329 B1 * | 5/2010 | Breslau et al. ............... 370/255 |
| 7,809,009 B2 * | 10/2010 | Tatar et al. ................... 370/419 |
| 7,864,769 B1 * | 1/2011 | Woo et al. ..................... 370/390 |
| 7,983,263 B2 * | 7/2011 | Jain et al. ..................... 370/390 |
| 8,605,722 B1 | 12/2013 | Sindhu et al. |
| 2002/0001310 A1 * | 1/2002 | Mai et al. ..................... 370/390 |
| 2002/0150094 A1 * | 10/2002 | Cheng et al. ................. 370/389 |
| 2004/0252690 A1 * | 12/2004 | Pung et al. ................... 370/390 |
| 2006/0034310 A1 | 2/2006 | Connor |
| 2007/0171917 A1 | 7/2007 | Dai |
| 2008/0209156 A1 | 8/2008 | Inoue et al. |
| 2008/0291914 A1 | 11/2008 | Bi |
| 2010/0098078 A1 * | 4/2010 | Bisdikian ..................... 370/390 |
| 2010/0191915 A1 | 7/2010 | Spencer |
| 2011/0149729 A1 | 6/2011 | Benner et al. |

OTHER PUBLICATIONS

Juniper Networks, Inc., "Multicast Architectures in Crossbar-Based Routers: Replication Choices and Their Impact on Real-World HDTV", White Paper, 2009, 13 pp.

Quinn et al., RFC 3170, "IP Multicast Applications: Challenges and Solutions," Network Working Group, the Internet Engineering Task Force draft, Sep. 2001, available at http://tools.ietf.org/html/rfc3170, 29 pp.

Prosecution History from U.S. Pat. No. 8,605,722, dated Dec. 12,2007 through Aug. 8, 2013, 76 pp.

U.S. Appl. No. 61/285,482, by Pradeep Sindhu, filed Dec. 10, 2009.

* cited by examiner

DEADLOCK-RESISTANT FABRIC TREE REPLICATION IN A NETWORK DEVICE

This application is a continuation of U.S. application Ser. No. 12/759,850, filed Apr. 14, 2010, which claims the benefit of U.S. Provisional Application No. 61/285,482, filed Dec. 10, 2009, the entire content of each of which are incorporated herein by reference.

TECHNICAL FIELD

The invention relates to computer networks, and, more particularly, to replicating packet data in a computer network.

BACKGROUND

Applications that deliver substantially the same content at substantially the same time to multiple destination devices, such as Internet Protocol Television (IPTV), web-conferencing, video conferencing, and other multi-user applications, typically use multicast communication, or "multicasting," to reduce network bandwidth consumed and ease server burdens. Multicasting network packet data involves using routers and other network devices to replicate packets for receipt by multiple recipients and thereby reduce the transmission burden on the sender, leading to scalability and more efficient packet delivery to multiple recipient devices. Because the network replicates multicast packets at the routers, multicasting may reduce the redundant transmission that may occur when transmitting data for the above multi-user applications.

SUMMARY

In general, the invention is directed to techniques for reducing, if not possibly eliminating, deadlocks that may arise when performing switch fabric-based replication of multicast data in a network device. More specifically, techniques are described whereby, to prevent deadlocks, packet forwarding engines (PFEs) of a network device partition resources required for performing fabric replication according to a number of levels of a hierarchical fabric replication tree. By partitioning these resources, the PFEs may order or otherwise prioritize fabric replication for different packets of different fabric replication trees to avoid and potentially eliminate deadlocks within the network device.

For example, packet forwarding engines (PFE's) of a router implement the techniques to partition PFE resources in a manner that assigns one partition of the resources to each level of a largest, in terms of depth, fabric replication tree supported by the router. These PFE resources typically comprise memory, such as static random access memory (SRAM). Each of the PFEs then assigns an order to the partitions, where the order is based on the corresponding level in the hierarchical fabric replication tree. To illustrate, for any particular router, the depth of a fabric replication tree is bounded by the tree type and the number of PFEs. Assuming the tree type is a balanced binary tree, the maximum depth of such a tree is equal to floor($\log_2(N)$), where N is the number of PFEs. Assuming further that N equals eight (or $2^3$), the maximum depth equals floor($\log_2(2^3)$), or three, and the tree therefore has four levels (the root node occupying level zero having depth zero). Given these assumptions, each of the PFEs partition the resources into three partitions, assigning one partition to a first order, a second partition to a second order, and a third partition to a third order. The first order is assigned for the level one in the fabric replication tree. The second order is lower than the first and assigned for the second level dependent on the first level in the fabric replication tree. The third order is assigned for the third level dependent on the second level in the fabric replication tree.

After partitioning the resources in this manner, the PFEs then receive packets or other data units, some of which require replication, such as multicast packets. In some instances, a first PFE, which may be denoted as "PFE A," receives a first multicast packet or some other packet that requires replication in accordance with a first fabric replication tree, while a second PFE, which may be denoted as "PFE B," receives a second multicast packet or some other packet that requires replication in accordance with a second fabric replication tree. The first fabric replication tree indicates that PFE A is the root and that PFE B resides in level one dependent on the root (PFE A). The second fabric replication tree indicates that PFE B is the root and that PFE A resides in the level one dependent on the root (PFE B). In this instance, both PFE A and PFE B attempt to reserve resources of the other PFE for replicating the first and second multicast packets in accordance with their corresponding first and second fabric replication trees. Rather than deadlock due to the cross-reservation of resources and inability to release resources in an ordered manner, PFEs A and B cross-reserve specific resource partitions according to the level of the respective fabric replication tree occupied by dependent PFE.

For example, a network device may generate fabric replication trees for replicating multicast packets according to distributed tree replication (DTR) techniques. The DTR techniques involve replicating multicast packets for multiple recipients according to a fabric replication tree that specifies various PFEs of the device as intermediate replication components in a multi-stage replication process. The concurrent replication of multiple multicast packets according to multiple associated fabric replication trees may result in mutual inter-PFE resource dependencies. To illustrate, consider that a PFE A may have PFE B as a child node in one fabric replication tree, while PFE B has PFE A as a child node in another fabric replication tree. In this scenario, the respective child nodes comprise resources required for the parent node to continue the DTR techniques. As a result, PFEs A and B are mutually dependent, which may cause PFEs A and B to block awaiting release of any required, mutually exclusive resources held by their counterparts.

According to the techniques of the invention, replication components (e.g., PFEs) of a network device include a fabric replication resource specific to each level of the tallest possible fabric replication tree for the network device. During a DTR process for a multicast packet, a PFE associated with a parent node of the associated fabric replication tree determines the level of the fabric replication tree that the child nodes occupy. Based on this determination, the parent-PFE requests access to the particular fabric replication resource on the child-PFEs that is designated for the level of the fabric replication tree occupied by the child nodes. If the specified resource is currently held by a child-PFE as part of another replication process, the parent-PFE blocks until the resource is free and access is granted. The parent-PFE then uses the fabric to replicate the multicast packet to the child-PFEs and directs the child-PFEs to use the designated resource for additional replication tasks for the multicast packet.

In one embodiment, a network device includes a multicast virtual interface port for each level of a largest, in terms of depth, fabric replication tree supported by the router. During a DTR process, a PFE associated with a node that occupies a level n of the fabric replication tree receives a multicast packet on multicast virtual interface port n and will send the multicast packet, if necessary, to a multicast virtual interface port n+1 on the PFEs associated with child-nodes of the node in the fabric replication tree. Deadlock is mitigated as DTR proceeds according to the ordering of multicast virtual interface ports used during the DTR process.

In one embodiment, the invention is directed to a network device comprising a plurality of packet replicators that each comprise a plurality of resource partitions. The network device further comprises a control unit configured to store a replication data structure for controlling replication of a packet by the packet replicators to produce a plurality of output packets, wherein the replication data structure comprises a root node that corresponds to a first one of the plurality of packet replicators and one or more additional nodes that correspond to one or more other ones of the plurality of packet replicators, wherein the root node and one or more additional nodes are arranged hierarchically to occupy one or more levels of the replication data structure, wherein each of the plurality of resource partitions in each of the plurality of packet replicators is associated with a different one of the one or more levels of the replication data structure, wherein the packet replicators replicate the packet according to the replication data structure. In addition, each of the additional packet replicators handles the packet using the one of the resource partitions of the additional packet replicator that is associated with the level of the replication data structure occupied by a node of the replication data structure that corresponds to the additional packet replicator.

In another embodiment, the invention is directed to a network device comprising a plurality of packet forwarding engines having a plurality of network interfaces to receive inbound multicast packets and output a plurality of copies of the multicast packets. The network device further comprises a switch fabric interconnecting the plurality of packet forwarding engines, wherein the packet forwarding engines forward the inbound multicast packets through the switch fabric for replication by the packet forwarding engines to produce the plurality of copies of the inbound multicast packets, and wherein each of the packet forwarding engines comprises a packet buffer having multiple partitions, each of the partitions corresponding to a different level of a multi-level replication data structure that controls the forwarding of the inbound multicast packets through the switch fabric.

In another embodiment, the invention is directed to a method comprising receiving inbound multicast packets with one of a plurality of network interfaces of a network device. The method further comprises forwarding the inbound multicast packets in accordance with a multi-level replication data structure that controls the forwarding of the inbound multicast packets through a switch fabric for replication by a plurality of packet forwarding engines to produce a plurality of copies of the inbound multicast packets, wherein the multi-level replication data structure comprises a plurality of hierarchically arranged nodes each associated with one of the packet forwarding engines, wherein each of the packet forwarding engines comprises a packet buffer having multiple partitions, each of the partitions corresponding to a different level of the multi-level replication data structure. The method further comprises handling forwarded inbound multicast packets in a packet forwarding engine that receives copies of the inbound multicast packets using the one of the packet buffer partitions that is associated with the level of the multi-level replication data structure occupied by a node of the multi-level replication data structure that corresponds to the receiving packet forwarding engine, and outputting the plurality of copies of the inbound multicast packet with the network interfaces.

In another embodiment, the invention is directed to a computer-readable medium containing instructions. The instructions cause a programmable processor to receive inbound multicast packets with one of a plurality of network interfaces of a network device, and forward the inbound multicast packets in accordance with a multi-level replication data structure that controls the forwarding of the inbound multicast packets through a switch fabric for replication by a plurality of packet forwarding engines to produce a plurality of copies of the inbound multicast packets, wherein the multi-level replication data structure comprises a plurality of hierarchically arranged nodes each associated with one of the packet forwarding engines, wherein each of the packet forwarding engines comprises a packet buffer having multiple partitions, each of the partitions corresponding to a different level of the multi-level replication data structure. The instructions further cause the programmable processor to handle forwarded inbound multicast packets in a packet forwarding engine that receives copies of the inbound multicast packets using the one of the packet buffer partitions that is associated with the level of the multi-level replication data structure occupied by a node of the multi-level replication data structure that corresponds to the receiving packet forwarding engine, and output the plurality of copies of the inbound multicast packet with the network interfaces.

The techniques described may present several advantages. For instance, partitioning and using the fabric replication resources in this manner may eliminate deadlocks caused by mutual inter-PFE resource dependence, for replication proceeds according to the ordering of the fabric replication tree, and the replication resources are dedicated to servicing particular fabric replication tree levels. Because a child PFE-node of a fabric replication tree never requests access to replication resources on its parent PFE-node during a DTR process, a resource access request by a parent PFE-node to a child PFE-node during another DTR process for a different fabric replication tree avoids deadlock. For example, in an instance where a PFE A may have PFE B as a child node in one fabric replication tree, while PFE B has PFE A as a child node in another fabric replication tree, neither PFE A nor PFE B ever conditions release of a level-specific replication resource upon its counterpart also releasing a resource designated for the same level. As mutual conditioning (or, more generally, circular conditioning) is a prerequisite to a deadlock, the techniques described may prevent deadlock during DTR processes and increase utilization of the fabric bandwidth.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
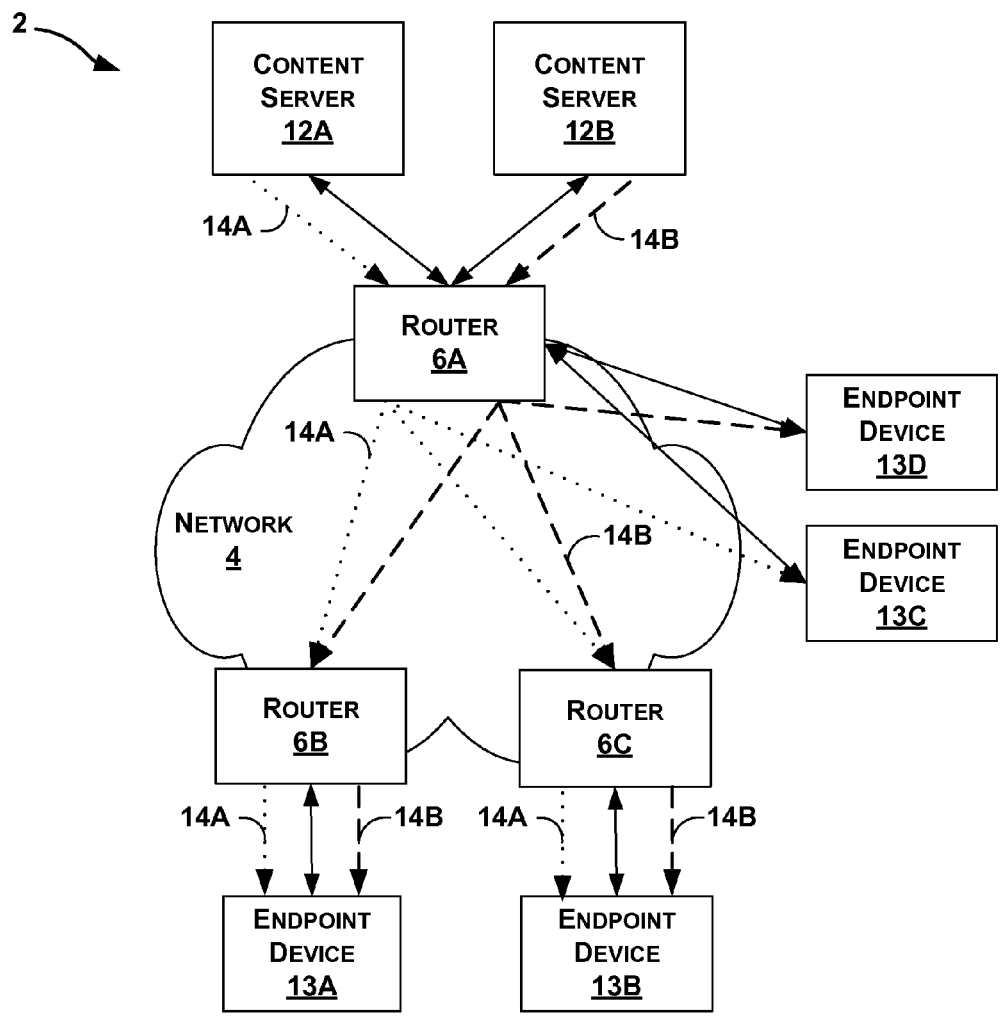
FIG. 1 is a block diagram illustrating an exemplary network that delivers multicast traffic to various endpoints connected to the network.

FIG. 1 is a block diagram illustrating an exemplary network system 2 that implements the multicast replication techniques described in this disclosure. More specifically, network system 2 includes a network 4 in which one example of an intermediate network device, such as router 6A, implements the multicast replication techniques described in this disclosure. Router 6A represents an intermediate network device in that router 6A is intermediate to one or more of content servers 12A, 12B and one or more of endpoint devices 13A-13D. While described herein with respect to the particular intermediate network device shown in the example of FIG. 1 as router 6A, the techniques may be implemented by any network device, including a router or any other network device capable of performing multicast replication. For example, the techniques could be applied by routers 6B and 6C instead of or in conjunction with router 6A. In addition, while described herein with respect to multicast, the techniques are applicable to other one-to-many network delivery mechanisms, such as broadcast and anycast.

In the example of FIG. 1, network system 2 includes a number of endpoint devices 13A-13D ("endpoint devices 13") coupled to a network 4. Each of endpoint devices 13 comprises one or more of a personal computer, a laptop computer, a mobile telephone, a network telephone, a television set-top box, a network device integrated into a vehicle, a video game system, a point-of-sale device, a personal digital assistant, an intermediate network device, a network appliance, a supercomputer, a mainframe computer, or another type of device capable of interfacing with and communicating over network 4. Each of endpoint devices 13 typically provide an interface (e.g., display, speakers, keyboard, mouse, and the like) with which respective users (not shown) interact to access content delivered via data units, such as packets, by network 4.

Network system 2 further includes content servers 12A and 12B ("content servers 12") that store or otherwise source content, which, as used herein, typically refers to any data commonly transmitted and/or stored within a network, such as web-based applications, images, documents, web pages, video data, audio data (including voice data), web-based games, scripts, or any other type of content capable of being delivered via a network. Content available on content servers 12 may be sent for the purpose of, for example, web and videoconferencing, stock quote streaming, streaming television (commonly known as Internet protocol television or IPTV), and other applications. Each of content servers 12 may be a high-end server, a personal computer, a laptop computer, a data center, an application server, a digital video camera, an intermediate network device, a network appliance, a supercomputer, a mainframe computer, a telephone handset, a microphone, a combination of such devices, or any other type of device capable of sourcing content over network 4.

Network 4 represents a packet-switched network that delivers data, including content sourced by content servers 12, via data units referred to as packets. Often, network 4 implements a layer three (where reference to "layers" refers to the corresponding layer in the Open Systems Interconnection or OSI model) protocol, such as an Internet protocol (IP). To route or otherwise transmit or forward these packets, network 4 includes routers 6A-6C ("routers 6") that route the Internet protocol (IP) packets through network 4. As routers 6 each route layer three (which is also referred to a "network layer") packets, routers 6 are commonly characterized as layer three network devices. Considering that these IP packets may include data defining content or portions of the content, one or more of routers 6 may therefore be characterized as routing content to endpoint devices 13 via one or more packet-based protocols, such as the Internet Protocol (IP).

While described in this disclosure as transmitting, conveying, or otherwise supporting packets, network 4 may transmit data according to any other discrete data unit defined by any other protocol, such as a cell defined by the Asynchronous Transfer Mode (ATM) protocol. In addition, network 4 may comprise a public network, such as the Internet, a private network, such as those owned and operated by an enterprise, or a combination of both public and private networks. Network 4 may further comprise one or more Wide Area Networks (WANs), Local Area Networks (LANs), Virtual Local Area Networks (VLANs), Virtual Private Networks (VPNs), and/or any another type of network. In some instances for example, network 4 comprises a large public WAN, such as the Internet, over which a number of private networks owned by the same enterprise communicate to form a VPN. Thus, although shown as a single network 4 in FIG. 1, network 4 may comprise any number of interconnected networks, either public or private, in which the various networks interconnect to form various virtual networks.

Generally, routers 6 receive and route two distinct types of traffic. The first type of traffic is referred to as unicast traffic. Unicast traffic is traffic sent from a single source device and destined for a single destination device. The second type of traffic is referred to as multicast traffic. Multicast traffic is traffic sent from a single source device and destined for multiple destination device, hence the name "multicast" traffic. To route unicast traffic, the router examines a destination address stored to a header of a given unicast packet and routes the unicast packet based on this destination address. Routing multicast traffic however requires additional routing steps, as multicast traffic is commonly delivered so as to reduce replication and transmission burdens on a route that originates multicast traffic within network 4.

To route multicast traffic, routers 6 of network 4 often support a protocol, such as the Internet Group Management Protocol (IGMP), that facilitates routing of multicast traffic. In general, network devices use IGMP, for instance, to establish and manage network multicast group memberships. IGMP may therefore also be used to establish a network multicast group to which one or more of endpoint devices 13 may subscribe to receive multicast communications from one of content servers 12 via routers 6 of network 4. Any of endpoint devices 13 may request to subscribe (e.g., "join" in terms of IGMP) a network multicast group in accordance with the protocol, which for illustrative purposes is assumed to be IGMP. If one of routers 6 grants the join request, the requesting one of endpoint devices 13 becomes a member of the network multicast group.

Routers 6 often store data that defines a network multicast group in accordance with IGMP, where this network multicast group comprises a list of one or more of endpoint devices 13 that have joined a given multicast stream. Each network multicast group is associated with a single multicast group address established by routers 6. In a typical multicast session, one of content servers 12 transmits multicast packets to a multicast group address. Packets sent to the multicast group address are replicated by routers 6 and forwarded to all members of the network multicast group associated with the multicast group address. Network 4 transmits multicast packets by using downstream routers 6 to replicate the packets only when necessary to reach multiple recipients. As a result, only a single copy of a multicast packet is delivered along any branch of the tree, thus reducing much of the redundant transmission that may occur when transmitting data for multi-user applications.

In this way, routers 6 generally support multicasting to replicate data packets for receipt by multiple recipients and thereby reduce the transmission burden on content servers 12 and intermediate portions of network 4 (e.g., routers 6). Example multicast applications include video games, Voice over Internet Protocol (VoIP), Internet Protocol Television (IPTV), video-telephony, video-conferencing, Internet tele-conferences, online web-based meetings, archived video playback, multicast messaging (e.g., "Twitter"), software update rollouts, and other applications that typically presents content concurrently, simultaneously, or "live" to a plurality of devices.

Additional information about multicasting techniques in general may be found in Quinn & Almeroth, RFC 3170, "IP Multicast Applications: Challenges and Solutions," Network Working Group, the Internet Engineering Task Force draft, September 2001, which is incorporated herein by reference in its entirety. IGMP is described in Cain et al., RFC 3376, "Internet Group Management Protocol, Version 3," Network Working Group, the Internet Engineering Task Force proposed standard, October 2002, which is incorporated herein by reference in its entirety.

Each of routers 6 maintain network multicast groups and transmit multicast data for the network multicast groups according to respective multicast distribution trees 14A and 14B ("multicast distribution trees 14"), both of which branch at router 6A (as illustrated by respective dotted and dashed lined arrows in FIG. 1). For example, the multicast group corresponding to multicast distribution trees 14A comprises endpoint devices 13A, 13B, and 13C, while the multicast group corresponding to multicast distribution trees 14B comprises endpoint devices 13A, 13B, and 13D. Because multicast distribution trees 14 branch at router 6A, that router replicates multicast traffic for transmission to each of the branches of the respective trees. Thus, for multicast distribution tree 14A, for instance, router 6A replicates multicast traffic received from one of content servers 12 and forwards the replicated multicast traffic (e.g., from content server 12A) to endpoint device 13A (via router 6B), endpoint device 13B (via router 6C), and endpoint device 13C. Each of multicast distribution trees 14 (and by extension each network multicast group) is associated with a particular multicast group address, which identifies multicast packets with the associated one of multicast distribution trees 14.

Router 6A replicates multicast traffic received from content servers 12 and distributes the replicated traffic to multiple endpoint devices 13. For example, router 6A uses a modified distributed tree replication (DTR) technique to replicate multicast traffic according to the techniques herein described. DTR leverages the forwarding components (not shown in FIG. 1) of router 6A (which may be referred to as "packet forwarding engines" or "PFEs") to spread fabric-level packet replication between multiple egress PFEs that are nodes of a hierarchically arranged replication data structure that specifies various PFEs of the device as intermediate packet replicators in a multi-stage DTR process. In some embodiments, DTR leverages packet replicators each associated with various network interfaces of a switching device, such as router 6A. In exemplary router 6A, the replication data structure is a fabric replication tree. A switch fabric therefore replicates a multicast packet received from the ingress PFE and sends the packet, according to the fabric replication tree associated with the packet, to one or more egress PFEs, which may each locally replicate and forward the packet toward endpoint devices 13 via outbound interfaces. In addition, each of the egress PFEs replicates the packet via the switch fabric to an additional one or more egress PFEs, again according to the fabric replication tree. This process cascades until each PFE of router 6A having an outbound interface receives the multicast packet. Additional information about distributed tree replication may be found in U.S. Pat. No. 7,420,972, which is incorporated herein by reference in its entirety.

Fabric replication trees, including for instance the respective fabric replication trees corresponding to multicast distribution trees 14A and 14B, may specify a circular dependency among two or more of the PFEs. For example, the fabric replication tree for multicast distribution tree 14A may direct PFE node A to replicate a multicast packet to PFE node C, while the fabric replication tree for multicast distribution tree 14B may conversely direct PFE node C to replicate a multicast packet to PFE node A.

In the example of FIG. 1, router 6A implements the techniques of the disclosure to provide a DTR mechanism that reduces if not eliminates deadlocks that result from circular dependencies. The term "deadlock" refers to instances in which two or more PFEs or other forwarding modules each request a resource, such as space within on-chip memory, from each other concurrently (as is the case in circular dependencies), leading to both of these PFEs to wait for a response and unable to further process packets until the response is received and their own resources are freed. Each of the PFEs is waiting on the other to respond to the request and cannot continue processing packets until the response to the request is received, thereby becoming "deadlocked" in the sense that the PFE is non-operational or "dead" due to the interlocked nature of the circular dependency between the two PFEs.

To avoid becoming deadlocked, router 6A, as one example, is enhanced in accordance with the techniques to partition mutually exclusive resources required for replication according to the number of levels of the tallest possible fabric replication tree for the router. The depth of a fabric replication tree is implementation specific and depends on the number of replicating components (e.g., PFEs) and on the tree type. For example, a balanced binary fabric replication tree has a maximum depth of $M=\text{floor}(\log_2(N))$, where N is the number of PFEs. Therefore, for this example, router 6A partitions the mutually exclusive resources required for replication into M partitions. According to the techniques of the invention, each of the segments is dedicated to a different level of the possible fabric replication trees for the router. In exemplary router 6A, a fabric replication tree root (level 0), does not require a resource partition to perform replication. Therefore, router 6A assigns the M partitions to the remaining levels 1 through M. In some embodiments, router 6A may assign a resource partition to each of the fabric replication tree levels, including level 0.

In addition, the DTR algorithm for router 6A is modified to require that, during a replication process for a multicast packet corresponding to a particular fabric replication tree, a PFE seeking to replicate a packet to one or more child node-PFEs specify a level-specific replication resource according to the depth position of the child node-PFEs in the fabric replication tree. Because the replication resources on the PFEs are ordered by fabric replication tree level, DTR for multicast packets received by router 6A proceeds down the replication resource partition chain of the various egress PFEs. In addition, the last partition used by a PFE for any particular fabric replication tree drains as the PFE forwards a packet held by that partition to its destination. As a result, performing DTR in accordance with the techniques of this disclosure reduces, if not eliminates, occurrences of deadlock among two or more DTR processes concurrently running on router 6A.

Figure 2:
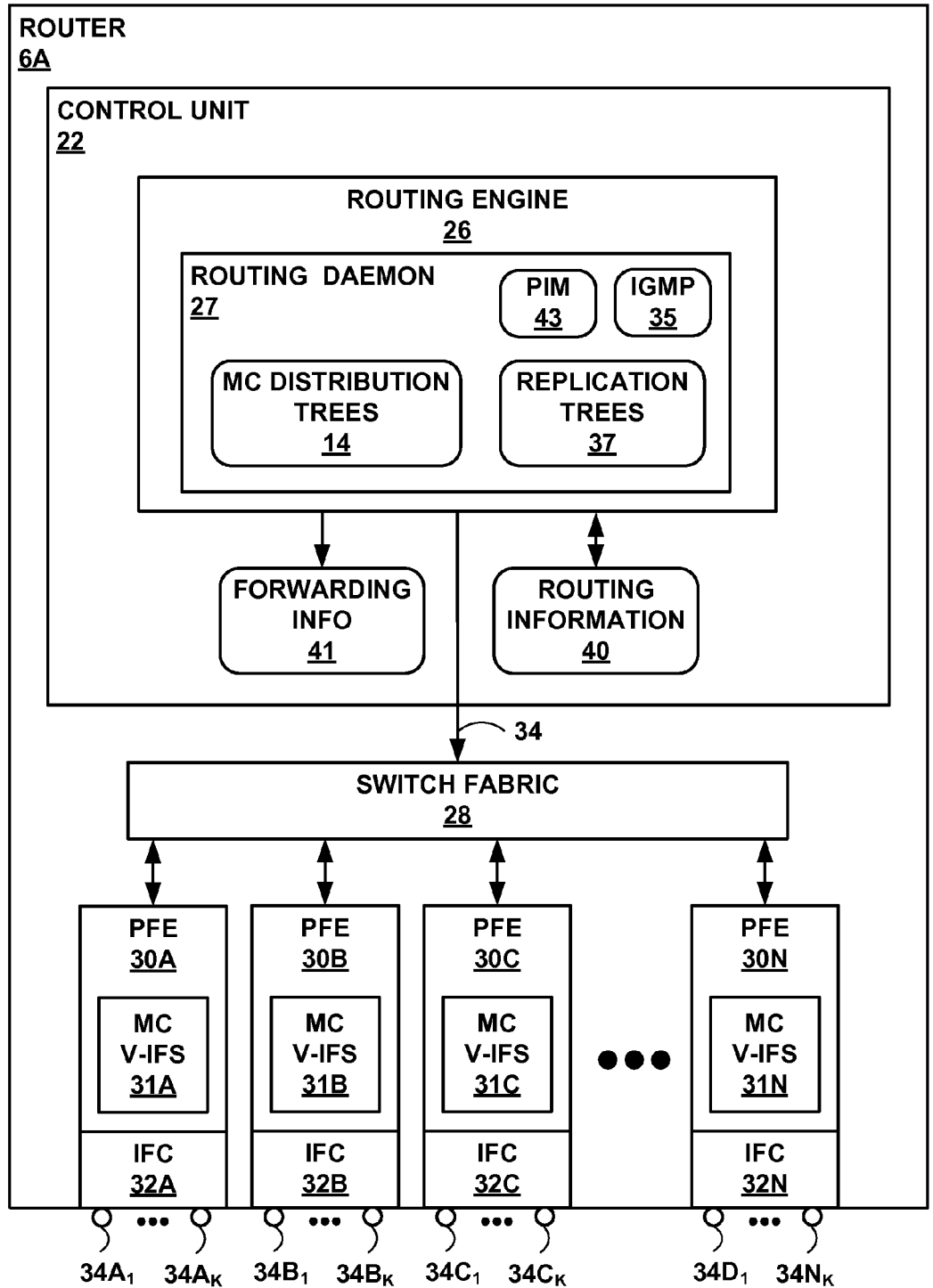
FIG. 2 is a block diagram illustrating an example router that implements the techniques of the invention.

FIG. 2 is a block diagram illustrating router 6A of FIG. 1 in more detail. Again, although described below with respect to a particular network device, e.g., router 6A, the techniques described in this disclosure are applicable to other network devices that replicate packets according to distributed tree replication (DTR) or a similar replication mechanism.

In this example, router 6A comprises control unit 22 that provides an operating platform for routing engine 26. Control unit 22 may comprise a programmable processor that executes software instructions (often in the form of a computer program). Routing engine 26 includes a routing daemon 27 that, in general, implements routing protocols (not shown in FIG. 2 for ease of illustration purposes) to exchange routing information 40 with other network devices. Routing engine 26 uses routing information 40 to derive and store forwarding information 41 ("forwarding info 41") that associates network destinations with specific next hops and corresponding interfaces of router 6A.

Router 6A further comprises a set of interface cards 32A-32B ("IFCs 32") that each include a set of K interfaces (collectively, "interfaces 34") for exchanging packets with other network devices. For example, interface card 32A includes interfaces $34A_1$-$34A_K$. Each of IFCs 32 is associated with a respective one of packet forwarding engines 30A-30N ("PFEs 30"). Router 6A additionally comprises switch fabric 28 that may interconnect PFEs 30 in a full mesh topology such that each of PFEs 30 may be directly connected, via switch fabric 28, to any other one of PFEs 30. When router 6A receives a packet at one of IFCs 32, the associated one of PFEs 30 determines a destination and associated next hop for the packet based on forwarding information received from routing engine 26 and outputs the packet on the one of IFCs 32 that includes the next hop interface from among interfaces 34.

In exemplary router 6A, switch fabric 28 may replicate packets received from one of PFEs 30 to one or more other PFEs 30. That is, a sending one of PFEs 30 may direct switch fabric to deliver a copy of a packet, such as a multicast packet, to multiple receiving ones of PFEs 30. In some embodiments, switch fabric 28 is unable to replicate packets, and therefore a sending one of PFEs 30 must separately send a copy of a packet to each of the receiving ones of PFEs 30.

Routing engine 26 is communicatively coupled to PFEs 30 with communication link 34. While shown in FIG. 2 as connecting routing engine 26 to PFEs 30 via switch fabric 28, in some instances, communication link 34 may be a separate shared bus, dedicated cables or lines, a backplane, or other any other connection medium, either wired or wireless.

In the example of FIG. 2, routing daemon 27 runs Internet Group Management Protocol (IGMP) 35 to manage network multicast group membership. Routing daemon 27 additionally implements a multicast routing protocol, such as Protocol Independent Multicast protocol 43 ("PIM 43), to determine forwarding paths to connected network devices that are members of one or more multicast groups, e.g., the multicast groups corresponding to multicast distribution trees 14 of FIG. 1. In conjunction with other network devices, PIM 43 generates one of multicast distribution trees 14 for each of the multicast groups. Multicast distribution trees 14 include, therefore, multicast distribution trees 14A and 14B of FIG. 1. Generally, intermediate network devices, such as router 6A, use a multicast distribution tree to ensure that multicast traffic is properly distributed from a multicast source, e.g., content server 12A, to the leaves of the multicast distribution tree that represent the members of the associated multicast group, e.g., one or more of endpoint devices 13. Multiple members may share common branches of a multicast distribution tree.

In some instances, routers may be positioned at a fork of a multicast distribution tree, such as router 6A, which in the example of FIG. 1 is positioned at a fork in both of multicast distribution trees 14A and 14B. In other words, two or more branches of the tree combine at router 6A for multicast distribution trees 14A and 14B. Upon receiving multicast traffic associated with one of these multicast distribution trees 14A and 14B, router 6A replicates and forwards the multicast traffic on multiple outbound interfaces 34 that comprise the next hop interfaces for the branches of this one of multicast distribution trees 14A, 14B that combine at router 6A. To facilitate efficient replication and forwarding of multicast traffic associated with this one of multicast distribution trees 14A, 14B, routing daemon 27 may use routing information 40 and reference this one of multicast distribution trees 14A, 14B to generate one of fabric replication trees 37 (illustrated as "replication trees 37"). In some embodiments, router 6A receives one or more of fabric replication trees 37 from, for example, an administrator and stores the received trees as fabric replication trees 37.

Figure 3:
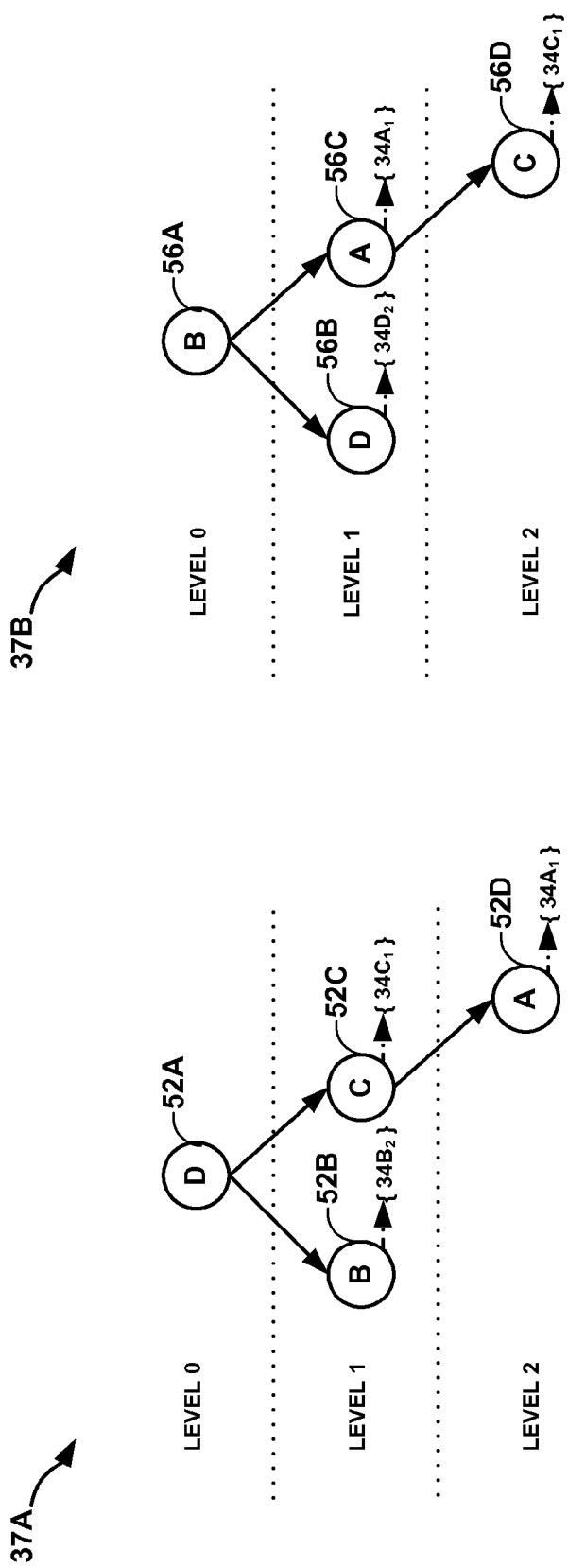
FIGS. 3A and 3B are diagrams illustrating exemplary fabric replication trees generated by the example router of FIG. 2.

A fabric replication tree is a hierarchical arrangement of the ingress one of PFEs 30 and all egress ones of PFEs 30 for a multicast packet. In one example, fabric replication trees 37 are formed in accordance with a balanced binary tree structure. In balanced binary trees, the nodes of the tree have at most two child nodes and, moreover, the depths of the leaf-nodes differ by at most one. Exemplary fabric replication trees 37 formatted in accordance with the balanced binary tree structure are illustrated in FIGS. 3A and 3B. In some embodiments, fabric replication trees 37 may be have an order greater than two (e.g., have more than two child nodes), may be unbalanced, or may be a different type of data structure. The techniques therefore should not be limited to the example fabric replication trees depicted by way of example in this disclosure.

To create one of fabric replication trees 37, routing daemon 27 queries one of multicast distribution trees 14 to create a list of all egress ones of PFEs 30 that contain one or more of the outbound interfaces for associated multicast traffic. Routing daemon 27 then arranges the ingress one of PFEs 30 and the egress ones of PFEs 30 as nodes such that the ingress one of PFEs 30 is the root of the tree and each node has one or more child nodes. In addition, each node comprises a list of all outbound interfaces contained by one of PFEs 30 associated with the node. Routing daemon 27 may generate one of fabric replication trees 37 in this or another manner for all or a subset of multicast distribution trees 14.

In operation, distributed tree replication (DTR) proceeds as each node-PFE replicates multicast traffic to its child node-PFEs, repeating until all of PFEs 30 containing an outbound interface receive the multicast traffic. Egress ones of PFEs 30 transmit the multicast traffic on the appropriate outbound interface. Egress PFEs containing multiple outbound interfaces for the multicast traffic replicate locally.

Resources dedicated to transmitting and replicating multicast traffic are limited. As a result, conventional devices that concurrently perform DTR processes for multiple fabric replication trees risk deadlock or packet drops, which may occur when a first and second PFE both lack additional multicast resources and yet are simultaneously seeking to replicate a multicast packet to one another.

According to the techniques described in this disclosure, each of PFEs 30 comprises a corresponding set of one or more multicast virtual interfaces 31A-31D (illustrated as "MC V-IFs 31A-31D"). For example, PFE 30A comprises a set of one or more multicast virtual interfaces 31A. PFE 30B comprises a separate set of one or more multicast virtual interfaces 31B, and so on. Described herein with respect to PFE 30A, each of multicast virtual interfaces 31A maps to resources for handling, which in this context may denote receiving, replicating, and/or transmitting, multicast data with PFE 30A. For example, each of multicast virtual interfaces 31A may map to a memory space, designated to that interface, for storing a multicast packet.

Routing engine 26 and PFEs 30 may identify multicast virtual interfaces 31A as next hop interfaces in forwarding information 41. Accordingly, routing engine 26 may designate, in forwarding information 41, one or more of multicast virtual interfaces 31A (or any other multicast interfaces in multicast interfaces 31A-31D) as a next hop interface for a multicast packet.

Because routing engine 26 may specify multicast virtual interfaces 31A as next hop interfaces for multicast traffic, routing engine 26 transforms fabric replication trees 37 to entries in forwarding information 41 to enable distributed tree replication. For example, one of fabric replication trees 37 may identify PFE 30B as a child node of PFE 30A. Accordingly, PFE 30A contains at least one outbound ones of interfaces 34A for multicast traffic associated with the one of fabric replication trees 37 and therefore transmits the multicast traffic on these outbound ones of interfaces 34A. In addition, PFE 30A must replicate multicast data traffic to PFE 30B to further DTR. To enable this replication, routing engine 26 creates a forwarding entry, designated for PFE 30A, in forwarding information 41 that specifies one of multicast virtual interfaces 31B of PFE 30B as a next-hop interface for multicast traffic associated with the one of fabric replication trees 37. Routing engine 26 may push or otherwise load all or a subset of forwarding information 41 to the designated ones of packet forwarding engines 30A-30B ("PFEs 30") via communication link 34.

As a result, to perform DTR, PFE 30A not only transmits multicast packets associated with this one of fabric replication trees 37 to outbound ones of interfaces 34A, PFE 30A also transmits multicast packets, according to forwarding information received from routing engine 26, to the specified one of multicast virtual interfaces 31B of PFE 30B via switch fabric 28. Because nodes in one of fabric replication trees 37 may have more than one child node, a sending one of PFEs 30 may have forwarding information that specifies, and therefore may direct switch fabric 28 to deliver a multicast packet to, more than one of multicast virtual interfaces 31. After PFE 30A replicates a multicast packet to all of the receiving ones of PFEs 30 specified in the forwarding information for PFE 30A, PFE 30A frees resources, such as one of multicast virtual interfaces 31A, that it held for the purpose of transmitting and replicating the multicast packet.

In some embodiments, routing daemon 27 may forgo the intermediate step of creating fabric replication trees 37 and instead cooperate with routing engine 26 to push appropriate forwarding information to PFEs 30 such that the PFEs 30 may perform DTR for multicast traffic. In other embodiments, routing engine 26 pushes fabric replication trees 37 to each of PFEs 30. In these embodiments, routing engine 26 may forgo transforming fabric replication trees 37 to forwarding entries that specify next hop information, and PFEs 30 query the fabric replication trees 37 to determine where to next switch multicast packets. In still other embodiments, the ingress one of PFEs 30 transmits, to the egress ones of PFEs 30, data correlating to one of fabric replication trees 37 along with an associated multicast packet. For example, this fabric replication tree data may be inserted into a header for the multicast packet. In this manner, egress ones of PFEs 30 may avoid querying forwarding information when replicating and transmitting a multicast packet and may instead rely on the fabric replication tree data received with the packet.

Regardless of how fabric replication trees 37 are maintained and utilized to perform packet replication, prior to transmitting a multicast packet to a specified one of multicast virtual interfaces 31, a PFE 30 must ensure that the multicast virtual interface is not currently being used by another DTR process for a different one of fabric replication trees 37. With reference to the above example, for instance, PFE 30A must first verify that the specified one of multicast virtual interfaces 31B is free to receive the multicast packet that PFE 30A intends to send.

In accordance with the techniques described in this disclosure, router 6A reduces, if not eliminates, deadlocks that may occur in conventional devices by establishing a set of one or more multicast virtual interfaces 31 for each of the associated PFEs 30 (e.g., the set of one or more multicast virtual interfaces 31 for PFE 30A) and by dedicating a different one of the set to different levels of the tallest possible fabric replication tree for router 6A. For example, because fabric replication trees 37 are balanced binary trees and router 6A has four PFEs 30, the tallest possible fabric replication tree for router 6A has a depth of two (calculated according to the formula M=floor $(\log_2(N))$, described above). In exemplary router 6A, the root (level 0) of a fabric replication tree does not require one of multicast virtual interfaces 31 to perform replication. Accordingly, router 6A dedicates one of each set of multicast virtual interfaces 31 to the remaining levels 1 through M. For example, router 6A dedicates one of multicast virtual interfaces 31B of PFE 30B for the level 1 and a second one of multicast virtual interfaces 31B of PFE 30B for level 2.

In addition, routing engine 26 is enhanced to account for the level occupied by child nodes of one or fabric replication trees 37 when creating a forwarding entry for a parent node that specifies one of multicast virtual interfaces 31 as a next-hop interface for multicast traffic associated with the one of fabric replication trees 37. For example, with reference to the example above, whereby PFE 30B is identified as a child node of PFE 30A for one of fabric replication trees 37, routing engine 26 first determines the level of the one of fabric replication trees 37 that is occupied by the node corresponding to PFE 30B. Routing engine 26 may, for instance, determine that the node for PFE 30B occupies level 2 of the one of fabric replication trees 37. To generate the forwarding entry, designated for PFE 30A, routing engine 26 selects the second one of multicast virtual interfaces 31B of PFE 30B as a next-hop interface for multicast traffic associated with the one of fabric replication trees 37 and received by PFE 30A.

As a result, when PFE 30A seeks to replicate a multicast packet to PFE 30B, PFE 30A specifies the second one of multicast virtual interfaces 31B, which is dedicated to the tree level occupied by the child node corresponding to PFE 30B. As the set of multicast virtual interfaces 31 on each of PFEs 30 is ordered by the levels of fabric replication trees 37, distributed tree replication proceeds from parent node to child node along a chain of ordered resources. In other words, a multicast packet is replicated down a chain of ordered multicast virtual interfaces 31 until the multicast packet reaches a leaf node of its associated one of fabric replication trees 37.

All PFEs 30 associated with a leaf node of one of fabric replication trees 37 are guaranteed to release the one of multicast virtual interfaces 31 that the leaf-node ones of PFEs 30 use to transmit an associated multicast packet. For example, if PFE 30B corresponds to a leaf node that occupies the first level of one of fabric replication trees 37, PFE 30B receives an associated multicast packet from another one of PFEs 30 and holds the first one of multicast virtual interfaces 31B to process the multicast packet. Because PFE 30B corresponds to a leaf-node, PFE 30B need not replicate the multicast packet to another one of PFEs 30. Rather, PFE 30B sends the multicast packet to the one or more outbound ones of interfaces 34B for transmission to other devices on outbound links (not shown). PFE 30B may then release the first one of multicast virtual interfaces 31B for processing of further multicast packets associated with any of fabric replication trees 37. In some instances, PFE 30B sends a multicast packet to one or more virtual interfaces corresponding to the one or more outbound ones of interfaces 34B for eventual transmission via the outbound interfaces.

By performing distributed tree replication in this manner, router 6A exhibits the above-mentioned characteristics. First, that a multicast packet is replicated down a chain of ordered multicast virtual interfaces 31 until the multicast packet reaches a leaf node of its associated one of fabric replication trees 37; and second, that the PFEs 30 that correspond to leaf nodes of fabric replication 37 are guaranteed to drain (or in other words, release resources after transmitting a multicast packet). These characteristics combine to possibly prevent any of multicast virtual interfaces 31 from being held indefinitely due to circular conditioning among multiple distributed tree replication processes, for draining (that is, resource release) proceeds up the chain of ordered multicast virtual interfaces 31.

As a result, the techniques described above potentially ensure that router 6A does not experience deadlock when concurrently executing multiple distributed tree replication processes in accordance with multiple fabric replication trees, as described below with respect to FIGS. 3A and 3B.

FIGS. 3A and 3B are diagrams illustrating exemplary fabric replication trees 37A, 37B generated by the example of router 6A of FIG. 2. FIG. 3A illustrates exemplary fabric replication tree 37A generated by the example router 6A of FIG. 2. PFEs 30 and switch fabric 28 of router 6A use fabric replication tree 37A to replicate multicast traffic for the multicast distribution tree 14A shown in FIG. 1. That is, fabric replication tree 37A corresponds to multicast distribution tree 14A in router 6A.

The example fabric replication tree 37A is shown in FIG. 3A as a balanced binary tree comprising multiple nodes 52A-52D ("nodes 52") that correspond to PFEs 30A-30D, respectively, of router 6A. For example, fabric replication tree 37A includes root node 52D associated with PFE 30D of router 6A, where this association is noted in FIG. 3A by the character "D" to suggest that root node 52D is associated with PFE 30D. Likewise, the association for each of nodes 52B-52D is also denoted by the respective letter assigned to the numeral associated with each of PFE 30A-30C. In any event, PFE 30D is the ingress one of PFEs 30 for multicast traffic corresponding to multicast distribution tree 14A. Nodes 52B-52D specify three egress ones of PFEs 30, namely, PFE 30B, PFE 30C, and PFE 30A, respectively. An ingress one of PFEs 30 may also, in some instances of fabric replication tree 37A, represent an egress one of PFEs 30. Nodes 52B-52D specify all outbound ones of interfaces 34 for the respective PFEs 30. For example, node 52B specifies interface $34B_2$ as an outbound interface for PFE 30B.

Each of the egress ones of PFEs 30 transmits multicast traffic via the outbound ones of interfaces 34 specified by nodes 52 to a downstream device of multicast distribution tree 14A. For example, PFE 30C transmits multicast traffic corresponding to multicast distribution tree 14A to endpoint device 13C via interface $34C_1$. A node 52 may specify more than one outbound ones of interfaces 34 for the corresponding PFE 30. If a PFE 30 comprises multiple outbound ones of interfaces 34, PFE 30 locally replicates multicast traffic to the outbound interfaces as well as, if necessary, replicating the multicast traffic to other PFEs 30 to further DTR.

Nodes 52B and 52D have no child nodes and are thus leaf nodes of fabric replication tree 37A. PFEs 30 corresponding to leaf nodes, i.e., PFE 30A and PFE 30B, do not depend upon any other PFEs 30 for resources to further the distributed tree replication according to fabric replication tree 37A.

Fabric replication tree 37A is hierarchically arranged, and each of nodes 52 occupies one of three levels, level 0-level 2. As described earlier, where the root node is defined as level 0, the maximum depth of a binary balanced tree is calculated as $M=\text{floor}(\log_2(N))$, where N is the number of nodes in the tree. Fabric replication tree 37A thus has depth=2.

In some embodiments, a fabric replication tree 37A may have a higher order. That is, each node may have more than the maximum two children as required by binary trees. In some embodiments, fabric replication tree 37A may be unbalanced such that the depths of the various leaf nodes differ by more than one level. Some embodiments of router 6A may have more or fewer than four PFEs 30, which may lead to a fabric replication tree 37A comprising more of fewer additional nodes 52 and a different number of possible levels. A typical configuration for routers that implement the techniques is for these routers to include 32 or $2^5$ PFEs. These routers would then generate fabric replication trees having a depth equal to $\text{floor}(\log_2(2^5))$, or five, for binary tree implementations.

FIG. 3B illustrates exemplary fabric replication tree 37B generated by example router 6A of FIG. 2. PFEs 30 and switch fabric 28 of router 6A use fabric replication tree 37B to replicate multicast traffic for the multicast distribution tree 14B shown in FIG. 1. That is, fabric replication tree 37B corresponds to multicast distribution tree 14B in router 6A.

Fabric replication trees 37A and 37B illustrate a circular dependency. In particular, fabric replication tree 37A illustrates PFE 30C as dependent upon PFE 30A for replication, while fabric replication tree 37B illustrates PFE 30A as dependent upon PFE 30C for replication. While performing concurrent DTR processes in accordance with respective fabric replication trees 37A and 37B, PFE 30C and PFE 30A may each exhaust the limit of their respective multicast replication resources, e.g, by filling a memory buffer. Because PFEs 30 condition release of multicast replication resources in use upon receiving a grant of access to multicast replication resources from the child-node PFEs 30, neither PFE 30A nor PFE 30C may proceed when both are requesting access to multicast replication resources from the other, resulting in deadlock.

Router 6A, to avoid deadlock in the above scenario, uses fabric replication tree 37A to implement the techniques of this disclosure by specifying level-specific partitions of multicast replication resources for each stage of a distributed tree replication (DTR) process, where each stage corresponds to a level of one of fabric replication trees 37. Having partitioned multicast replication resources, router 6A determines the particular partition of multicast replication resources to be used by one of PFEs 30, e.g., PFE 30A, during the DTR for fabric replication tree 37A by identifying the level of the tree occupied by node 52D corresponding to PFE 30A. In the example of fabric replication tree 37A, router 6A directs PFE 30A to use a multicast replication resource dedicated to level 2 for DTR for fabric replication tree 37A, for that is the level occupied by node 52D. Accordingly, DTR proceeds down a chain of level-specific multicast replication resources and router 6A consequently avoids deadlock.

Figure 4:
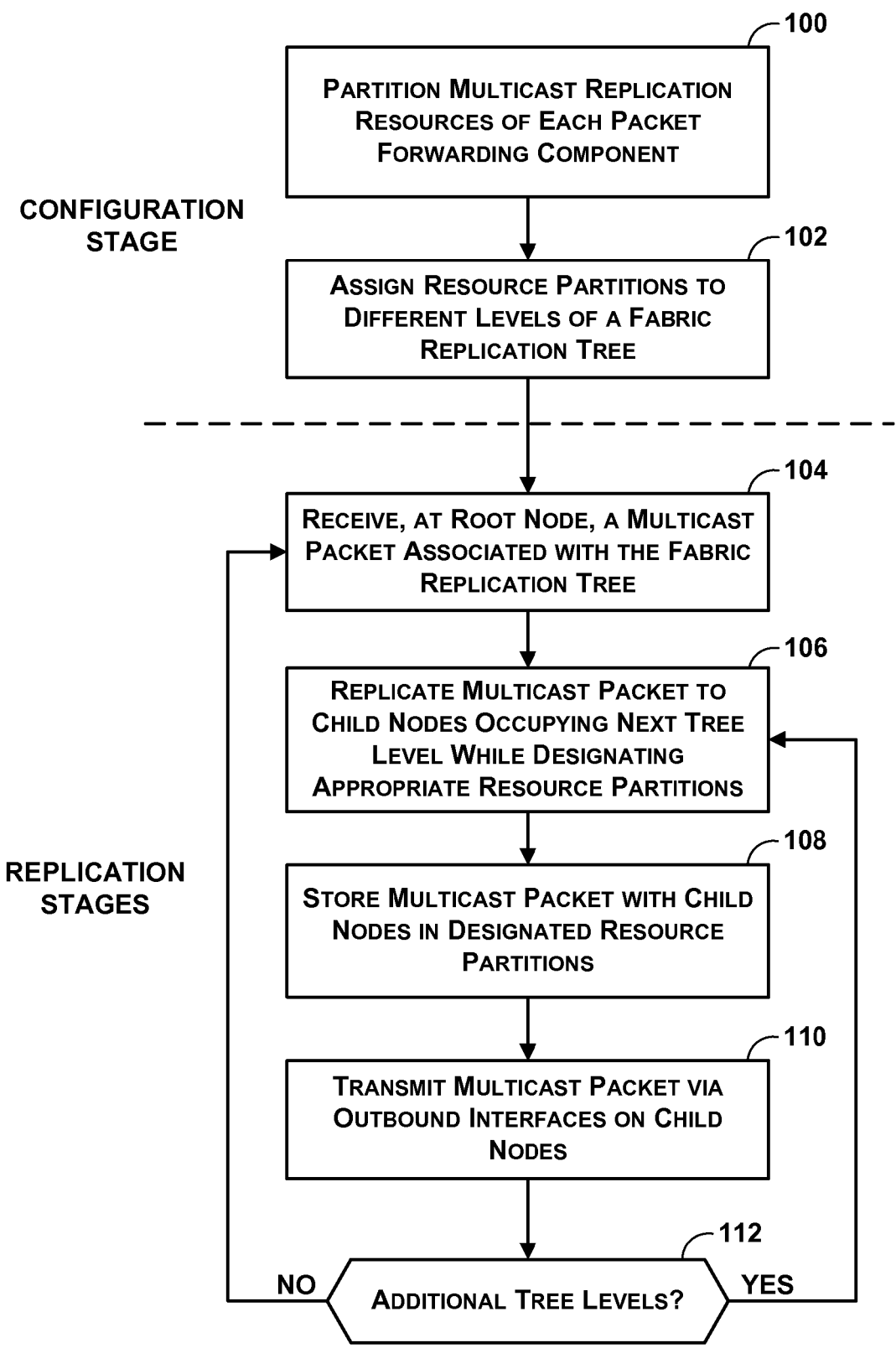
FIG. 4 is a flowchart illustrating an exemplary configuration and distributed tree replication process for a switching device that implements the techniques of the invention.

FIG. 4 is a flowchart illustrating, for a switching device, a configuration stage and replication stages for a DTR process that proceeds according to the techniques of the invention.

The switching device may perform distributed tree replication (DTR) using a fabric replication tree. At an initial configuration stage, the switching device partitions multicast replication resources for each of the forwarding components (e.g., PFEs) of the switching device (100). The switching device next stores data that assigns each of the partitioned resources for a given forwarding component to a different layer of the fabric replication tree (102). By assigning resources to levels in this manner, the switching device designates resources for the various replication stages as replication proceeds down the levels of the fabric replication tree.

After configuring the device, the switching device receives a packet, such as a multicast packet, that has been determined to require DTR according to the fabric replication tree at an ingress PFE that corresponds to the root node of the tree (104). The ingress PFE of the switching device determines the child node-PFEs of the root node that occupy level 1 of the fabric replication tree, and the ingress PFE, as a parent node-PFE, replicates and switches the multicast packet to the child nodes (106). When switching the multicast packet to the child nodes, the parent node-PFE specifies the particular resource that the child node-PFEs are to use to further the DTR process for the multicast packet (106). The particular resource is designated according to the level of the fabric replication tree occupied by the child nodes. The child node-PFEs receive the multicast packet and store it in the designated one of the partitioned resources (108).

The fabric replication tree only includes ingress and egress node-PFEs. The child node-PFEs therefore perform local replication of the received multicast packet for transmission to the one or more outbound interfaces for the multicast packet that the child node-PFEs contain (110). This completes a replication stage. If a child node-PFE is a leaf node of the fabric replication tree, the child node is a terminal node for the branch of the DTR process for the multicast packet (NO branch of 112). However, if a child node-PFE is not a leaf node (i.e., there are additional levels of the fabric replication tree), the child node-PFE becomes a parent node-PFE and initiates another replication stage for the DTR process (YES branch of 112).

Figure 5:
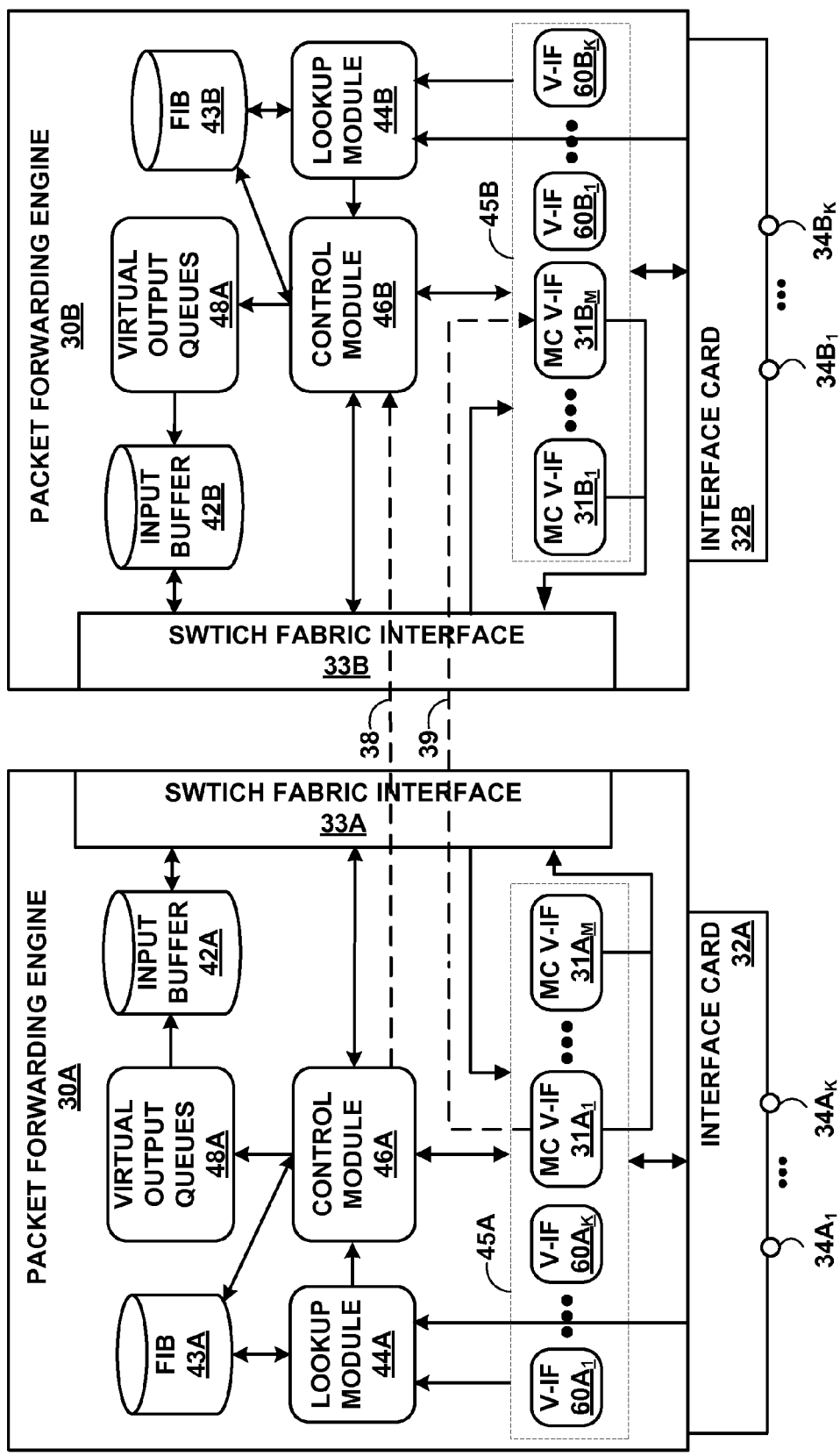
FIG. 5 is a block diagram illustrating exemplary forwarding components for the example router of FIG. 2.

FIG. 5 is a block diagram illustrating, in greater detail, interface cards 32A-32B and PFEs 30A-30B of router 6A that implement the modified DTR techniques described above to reduce if not eliminate occurrences of deadlock. PFEs 30A and 30B comprise substantially similar components that are hereinafter described with respect to either PFE 30A or PFE 30B.

PFE 30A comprises interface card 32A that includes interfaces $34A_1$-$34A_K$ (collectively, interfaces 34A). Interfaces 34A couple PFE 30A to other network devices in a network via network links (not shown in FIG. 5) to enable PFE 30 to exchange network packets with the coupled network devices. "Interfaces 34," as used herein, refers to the set of all interfaces associated with PFEs 30 of router.

PFE 30A further includes resources 45A for storing, replicating, and forwarding packets, including multicast packets. Resources 45A may comprise, for example, one or more data structures, memory space in a memory device such as a static RAM (SRAM), components of a general- or special-purpose processor, integrated circuitry, or other such resources for storing, replicating, and/or forwarding packets. Although illustrated independently, resources 45A may be integrated with one or more other components of PFE 30A. For example, control module 46A may comprise resources 45A in the form of on-chip SRAM.

Resources 45A include virtual interfaces $60A_1$-$60A_K$ ("virtual interfaces 60A") and multicast virtual interfaces $31A_1$-$31A_M$ (multicast virtual interfaces 31"). Virtual interfaces 60 map to and emulate interfaces $34A_1$-$34A_K$, respectively. PFE 30A may implement virtual interfaces 60A and multicast virtual interfaces 31A in a memory device, such as on-chip static RAM (SRAM), or another type of memory or storage device. For example, each of multicast virtual interfaces 31A may map to a different memory space in the memory address space of the memory device. Network packets may be received from, forwarded to, or offloaded to any of virtual interfaces 60A or multicast virtual interfaces 31A in a similar manner to that of interfaces 34A. As an example, forwarding information entries may identify one of multicast virtual interfaces 31A as a next hop interface. Each of multicast virtual interfaces 31A may receive a multicast packet, store the multicast packet in associated memory, and then offload the multicast packet as directed by PFE 30A. For example, PFE 30A may direct the multicast packet to one of interfaces 34A or one of virtual interfaces 60. In this way, router 6A may use virtual interfaces 60A and multicast virtual interfaces 31A as identifiers to internally route network packets among PFEs 30.

As described in detail below, PFE 30A implements virtual output queuing (VOQ). A general property of VOQ is a scarce amount of buffering capacity for next hop interfaces; rather, packets are initially buffered at the ingress ones of PFEs 30. Exemplary PFE 30A, for instance, implements multicast virtual interfaces 31A using on-chip SRAM. Because SRAM is typically expensive, memory space for PFE 30A may be limited. Accordingly, PFE 30A allocates a shallow buffer for multicast virtual interfaces 31A. In example PFE 30A, each of multicast virtual interfaces 31A has sufficient buffering capacity for one network packet, such as a multicast packet. In some embodiments, PFE 30A may have additional, limited buffering capacity for additional packets, for fabric replication tree information received in conjunction with a multicast packet, or both. In some embodiments, PFE 30A may implement multicast virtual interfaces 31A in off-chip memory such as that comprised by input buffer 42A.

PFE 30A further comprises switch fabric interface 33A, forwarding information base 40A ("FIB 43A"), and lookup module 44A. Switch fabric interface 33 provides an interface to switch fabric 28 (not shown in FIG. 5) that allows PFE 30A to exchange commands and data with other PFEs 30 on router 6A. FIB 43A comprises forwarding information to control the forwarding of packets by router 6A. As one example, FIB 43A includes forwarding entries for destination network devices having specific destination Internet Protocol (IP) addresses. As one example, FIB 43A is organized as a radix tree that maps a particular destination address to a next hop and ultimately to one or more interfaces 34 of router 6A. For example, an entry in FIB 43A may map the destination address for device 13A of system 2, having destination address $D_1$, to interface $34A_2$. As another example, the forwarding information of FIB 43A may map MPLS labels, VLAN tags, or any other type of keying information that can be obtained from a packet or other data unit and used to map the packet to an appropriate next hop.

FIB 43A further includes multicast forwarding entries derived from fabric replication trees 3 by routing engine 26.

In general, multicast packets are keyed to multicast forwarding entries based on three identifiers: 1) the source address of a multicast packet; 2) the multicast group address, identified as the destination address, for the multicast packet; and 3) the receiving interface. The multicast group address is associated with a network multicast group. Multicast forwarding entries in FIB 43A map the <source address, multicast group address, receiving interface> tuples (hereinafter, "multicast forwarding tuples") to one or more next hop interfaces. FIB 43A implements the techniques of this disclosure to include multicast virtual interfaces 31A as next hop interfaces that may be mapped to multicast forwarding entries, as well as interfaces 32A, virtual interfaces 60A, and similar interfaces on other PFEs 30 of router 6A. Such interfaces may also be identified as the receiving interface for a multicast packet. For instance, multicast virtual interface 31A$_2$ may be the "receiving interface" for a packet after the interface receives the packet from another one of PFEs 30 during a DTR process via switch fabric 28.

Moreover, as discussed above in detail with respect to FIG. 2, the mapping for the particular ones of multicast virtual interfaces multicast 31A-31D to the forwarding entry is generated by routing engine 26 in accordance with the techniques described herein. That is, routing engine 26 specifies the particular ones of multicast virtual interfaces 31A-31D in the mapping according to the level occupied by the child node-PFE in a fabric replication tree corresponding to the multicast packet that is keyed to the forwarding entry. For example, if one of fabric replication trees 37 indicates that PFE 30B corresponds to a child node of the node corresponding to PFE 30A and that the child node occupies level 2 of the tree, then routing engine 26 generates a multicast forwarding entry for multicast packets associated with the tree that specifies that the packets are to be switched to multicast virtual interface 31B$_2$, and routing engine 26 pushes this entry to FIB 43A.

Lookup module 44A determines, for a particular packet, the appropriate next hop interface for the packet on router 6A. Interfaces 34A on interface card 32A, virtual interfaces 60A, and multicast virtual interfaces 31A send packet data, such as a packet header, to lookup module 44 for processing. Lookup module 44A determines the destination address, multicast forwarding tuple, or other keying information of the packet from the packet data and queries FIB 43A for a forwarding entry matching the keying information. A matching entry specifies the appropriate next hop interface for the packet.

In some embodiments, routing engine 26 pushes one or more fabric replication trees 37 to PFEs 30 for storage in FIBs 40. In such embodiments, the ingress one of PFEs 30, e.g., PFE 30A, for a particular multicast packet may query FIB 43A to determine the one or more egress interfaces 34A-34D from the corresponding one of fabric replication trees 37. PFE 30A may then associate the egress interface data with the multicast packet, such as by encapsulating the packet in a header that comprises the egress interface data. In such embodiments, PFE 30A then sends the multicast packet and the egress interface data to egress ones of PFE 30, via switch fabric interface 33A, to advance the packet replication and transmission process.

PFE 30A further comprises input buffer 42A, virtual output queues 50A, and control module 46A. Input buffer 42 buffers network packets received by interfaces 34A. In other words, when PFE 30A is an ingress one of PFEs 30 for a packet, PFE 30A stores the packet for future processing. Input buffer 42 is typically a form of dynamic RAM (e.g., DRAM, SDRAM, DDR2 SDRAM, and the like) but may be another type of storage media. In some embodiments, input buffer 42 is shared among the various PFEs 30 of router 6A as distributed buffer memory. In some embodiments, virtual interfaces 60A and multicast virtual interfaces 31A are implemented as high-speed, on-chip memory within one or more packet forwarding integrated circuits, and input buffer 42A is provided by off-chip DDR2 coupled to the packet forwarding integrated circuits by a data bus.

In the example PFE 30A, input buffer 42A, virtual output queues 50A, control module 46A, virtual ports 60A, and multicast virtual ports 31A are configured to implement virtual output queuing (VOQ) to reduce the effect of the head of line (HOL) blocking problem experienced by input queued switches and thereby increase the throughput of switch fabric 28. Input buffer 42A stores network packets received by interfaces 34A, that is, those packets for which PFE 30A is the ingress one of PFEs 30. As a result, packets stored in PFE 30A are input queued and wait for scheduling to be switched across switch fabric 28 to the appropriate one or more egress PFEs 30. In some instances, two different ones of PFEs 30 may receive packets both having an outbound interface associated with a single one of PFEs 30. If packets enqueued for switching are held in a single queue, this may force one of the receiving ones of PFEs 30 to block until the other receiving one of PFEs 30 has switched its respective packet. Virtual output queuing may enable switch fabric 28 to maintain a high throughput despite such blocking.

Control module 46A is a hardware and/or software module that manages the flow of data and metadata for PFE 30A. To enable VOQ, control module 46A manages and schedules references in virtual output queues 48A to packet data stored by input buffer 42A. Virtual output queues 48A may include a set of N virtual output queues that correspond to the N PFEs 30 of router 6A. In example router 6A, virtual output queues 48A comprises N=4 virtual output queues. After lookup module 44A determines a next hop interface for a packet received by one of interfaces 34A, control module 46A enqueues a reference to the memory location of the packet as stored in the input buffer 42A address space. More particularly, control module 46A enqueues the references to the packet on the virtual output queue in the one of virtual output queues 48 that corresponds to the one of PFEs 30 that contains the next hop interface for the packet.

Each of virtual output queues 48A receives references to packets destined for the corresponding ones of PFEs 30 and maintains those references in the order that they were received. In this manner, each of virtual output queues 48A implements the characteristic first-in-first-out (FIFO) functionality of a queue data structure. In some embodiments, virtual output queues 48A includes separate queues dedicated to multicast traffic. For example, virtual output queues 48A may include a separate queue for multicast packets for which PFE 30A is a root node of a fabric replication tree, i.e., the ingress one of PFEs 30 for such multicast packets. In some embodiments, virtual output queues 48A may be partitioned into priority levels to enable quality of service guarantees for router 6A. For example, virtual output queues 48A may comprise eight virtual output queues, corresponding to eight different network traffic priority levels, for each of the N PFEs 30 of router 6A. In some embodiments, virtual output queues 48A includes virtual output queues for each of interfaces 34A-34D of PFEs 30.

Control module 46A schedules packets having a reference held by virtual output queues 48A for transmission to one of next hop virtual interfaces 60A-60D or multicast virtual interfaces 31A-31D according to a scheduling algorithm. Control module 46A may implement a scheduling algorithm that maximizes the switch fabric 28 throughput and, concomitantly, the packet throughput of router 6A. Upon scheduling a packet, control module 46A generates and sends one or more interface access requests to the one or more of PFEs 30 that include the next hop interfaces. Interface access requests includes an identifier specifying the one of virtual interfaces 60A-60D or multicast virtual interfaces 31A-31D requested.

Control module 46A is enhanced to implement the techniques of the disclosure by scheduling multicast packets stored in multicast virtual interfaces 31A for switching via switch fabric interface 33A, if necessary, to the ones of PFEs 30 containing next hop interfaces for the multicast packets. As illustrated in FIG. 5, multicast virtual interfaces 31A have both inbound and outbound data paths from/to switch fabric interface 33A. Thus, in addition to scheduling packets stored in input buffer 42A and referenced in virtual output queues 48A, control module 46A may therefore also schedule packets held by multicast virtual interfaces 31A to facilitate potentially deadlock-free distributed tree replication.

To perform switching for a multicast packet held for replication and/or transmission in one of multicast virtual interfaces 31A, control module 46A requests lookup module 44A to query FIB 43A for a multicast forwarding entry that keys to the multicast forwarding tuple (<source address, multicast group address, receiving interface>) identifying the multicast packet. Upon receiving a matching entry having one or more next hop interfaces for the multicast packet, control module 46A generates and sends an interface access request to the ones of PFEs 30 containing next hop interfaces for the multicast packet. In some embodiments, next hop interface data for a multicast packet is transmitted and stored together with the multicast packet data, e.g., in a multicast packet header. In such embodiments, control module 46A may query the associated next hop interface data to determine the appropriate next hop interfaces for a multicast packet.

The example shown in FIG. 5 additionally illustrates an interface access request 38 generated by control module 46A to further the DTR process for a multicast packet stored by multicast virtual interface $31A_1$. Because interface access request 38 is sent by control module 46A to control module 46B, the techniques for responding to requests for access to multicast virtual interfaces 31 are described with respect to PFE 30B.

Control module 46B manages access to virtual interfaces 60B and multicast virtual interfaces 31B for other PFEs 30 of router 6A attempting to switch packets to PFE 30B for delivery to these interfaces as next hop interfaces. Control module 46B receives, via switch fabric interface 33B, interface access requests from other PFEs 30 that have packets requiring access to virtual interfaces 60B or multicast virtual interfaces 31B.

Control module 46B may grant access to the requested one of virtual interfaces 60B when the requested interface comprises sufficient resources to receive the packet for which access is sought. When the requested interface does not comprise sufficient resources, control module 46B may deny the access request. In some embodiments, control module 46B automatically grants a previously denied access request when the requested one of multicast virtual interfaces 31B becomes available. Such embodiments may include a queue (not shown) for each of multicast virtual interfaces 31B that enqueues interface access requests. In some embodiments, control module 46B sends acknowledges an access request only when the requested one of multicast virtual interface 31B becomes available. Control module 46B dequeues interface access requests as the associated one of multicast virtual interfaces 31B becomes available.

As described above, multicast virtual interfaces 31B comprise M separate interfaces dedicated to different levels of the tallest possible fabric replication tree for router 6A. As further described above, requests for access to multicast virtual interfaces 31B may specify a particular one of multicast virtual interfaces $31B_1$-$31B_M$. Per the techniques described in this disclosure, DTR proceeds down a chain of multicast virtual interfaces 31A-31D of router 6A designated for the various fabric replication tree levels. In other words, each replication stage for a multicast packet stored by one of multicast virtual interfaces $31A_X$-$31D_X$ uses the next level of multicast virtual interfaces $31A_{X+1}$-$31D_{X+1}$ during the DTR process. For example, a multicast packet stored by particular one of multicast virtual interfaces 31A-31D that is dedicated to level 1 of the fabric replication tree, e.g., multicast virtual interface $31A_1$, is replicated, if necessary, to one of multicast virtual interfaces 31A-31D that is dedicated to level 2 of the fabric replication tree, e.g., multicast virtual interface $31B_2$. By first partitioning multicast replication resources into multicast virtual interfaces and then ordering the replication process among multicast virtual interfaces in this manner, PFEs 30 may reduce, if not avoid, DTR-related deadlock caused by a circular dependency among two or more DTR processes, as described above with respect to FIGS. 3A and 3B.

In some embodiments, the first replication stage (i.e., that performed by the ingress one of PFEs 30) may replicate packets from input buffer 42A to one of multicast virtual interfaces $31A_1$-$31D_1$ via switch fabric interface 33A.

Because control module 46A generated interface access request 38 to further the DTR process for a multicast packet stored by multicast virtual interface $31A_1$, in conjunction with the techniques herein described, interface access request 38 includes a request for access to multicast virtual interface $31B_2$. In the example router 6A, fabric replication trees 37 have a maximum depth of M=2. Consequently, multicast virtual interface $31B_2$ corresponds to multicast virtual interface $31B_M$ as illustrated in FIG. 5.

When multicast virtual interface $31B_M$ is available, control module 46B sends an access grant notification (not shown for ease of illustration purposes) to control module 46A to signify capacity in multicast virtual interface $31B_M$ for the multicast packet stored by multicast virtual interface $31A_1$. Upon receiving the access grant notification, control module 46A sends a copy of the multicast packet to PFE 30B via switch fabric interface 33A. FIG. 5 illustrates this transfer as packet switch 39. PFE 30B stores the multicast packet copy in multicast virtual interface $31B_M$. In some embodiments, packet switch 39 further includes forwarding information that specifies next hops, from PFE 30B, for the multicast packet.

Control module 46B performs local replication for multicast packets held in multicast virtual interfaces 31B for replication and/or transmission. For example, after receiving the multicast packet in packet switch 39, control module 46B requests lookup module 44B to query FIB 43B for a multicast forwarding entry that keys to the multicast forwarding tuple (<source address, multicast group address, receiving interface>) identifying the multicast packet. Upon receiving a matching entry having one or more next hop interfaces 34B for the multicast packet, control module 46B may schedule the multicast packet and then send the multicast packet to the next hop ones of interfaces 34B for transmission.

Figure 6A:
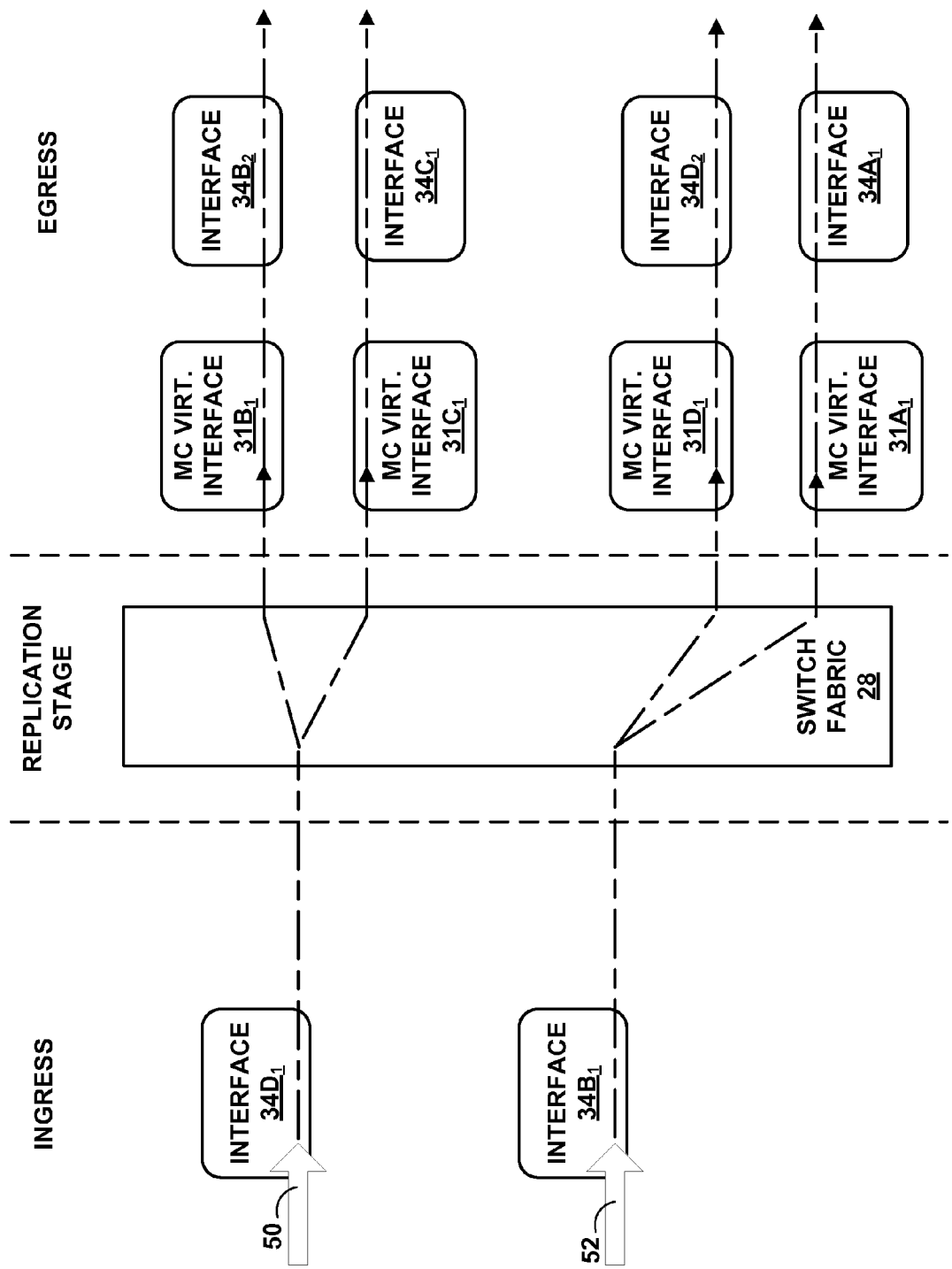
FIGS. 6A and 6B are block diagrams illustrating the movement of multicast traffic through components of the example router of FIG. 2 according to the techniques of the invention.
Figure 6B:
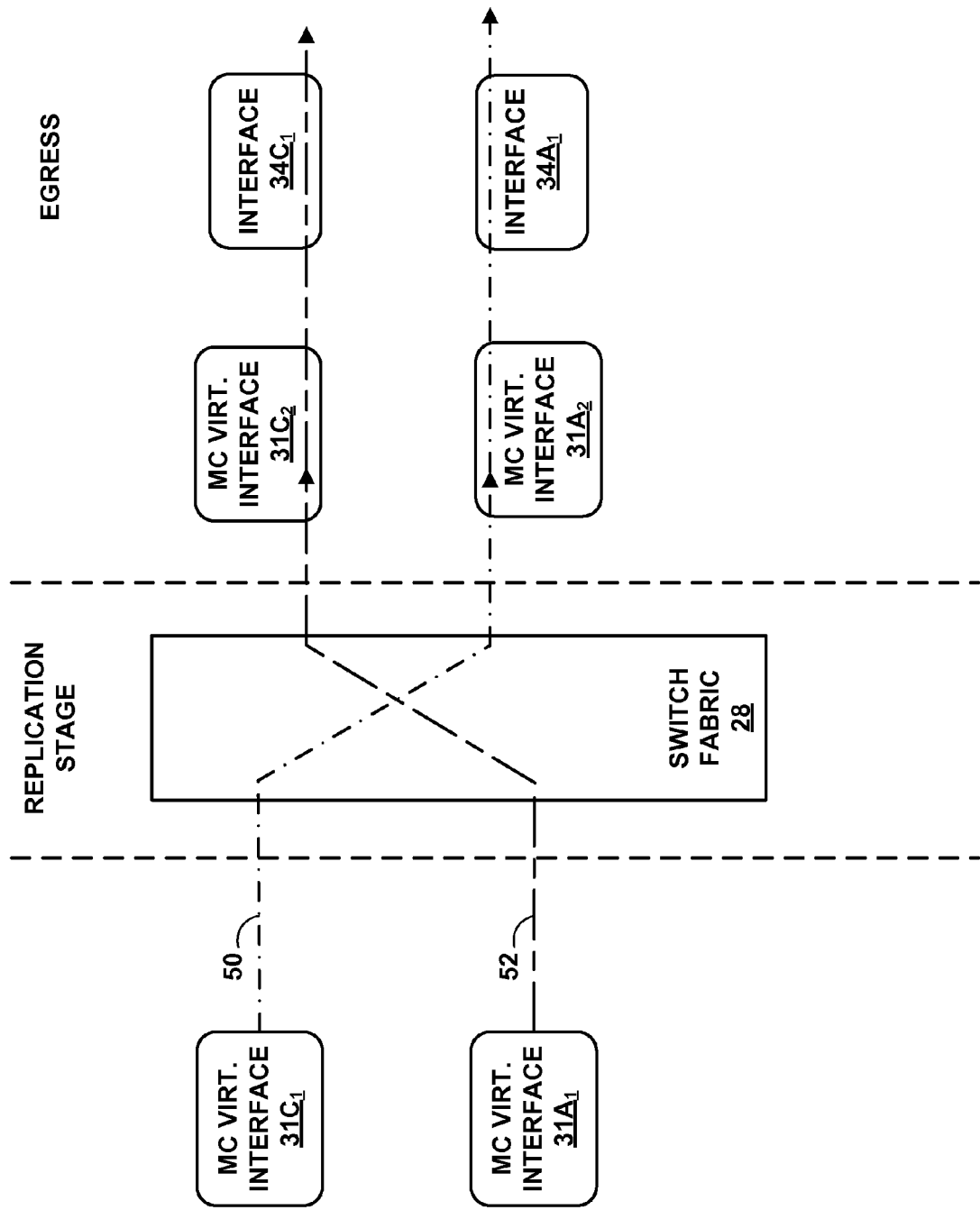

FIGS. 6A and 6B are block diagrams that illustrate, in parallel, the concurrent movement of multicast traffic according to distributed tree replication processes for the fabric replication trees 37A and 37B of FIGS. 3A and 3B. Fabric replication tree 37A of FIG. 3A specifies the DTR process for incoming multicast traffic 50; fabric replication tree 37B of FIG. 3B specifies the DTR process for incoming multicast traffic 52. The illustrated interfaces 34A-34D, multicast virtual interfaces 62A-62D, and switch fabric 28 correspond to the components of exemplary router 6A of FIG. 2.

As illustrated in FIG. 6A, PFE 30D receives multicast traffic 50 from associated interface $34D_1$ and, per the techniques of the invention, replicates and sends multicast traffic 50 to multicast virtual ports $31B_1$ and $31C_1$ of PFEs 30B and 30C, respectively. Multicast virtual ports $31B_1$ and $31C_1$ are multicast replication resources designated to handle multicast traffic 50 for the ones of PFEs 30 that correspond to the child nodes occupying level 1 of fabric replication tree 37A. Fabric replication tree 37A specifies that multicast traffic 50 has outbound interfaces $34B_2$ and $34C_1$. Accordingly, PFE 30B and PFE 30C transmit multicast traffic 50 to these respective interfaces.

As further illustrated in FIG. 6A, PFE 30B receives multicast traffic 52 from associated interface $34B_1$ and, per the techniques of the invention, replicates and sends multicast traffic 52 to multicast virtual ports $31D_1$ and $31A_1$ of PFEs 30D and 30A, respectively. Multicast virtual ports $31D_1$ and $31A_1$ are multicast replication resources designated to handle multicast traffic 52 for the ones of PFEs 30 that correspond to the child nodes occupying level 1 of fabric replication tree 37B. Fabric replication tree 37B specifies that multicast traffic 52 has outbound interfaces $34D_2$ and $34A_1$. Accordingly, PFE 30D and PFE 30A transmit multicast traffic 52 to these respective interfaces.

The DTR processes for fabric replication trees 37A and 37B is further illustrated in FIG. 6B. As described above, fabric replication trees 37A and 37B specify respective dependencies that result in a circular dependency between PFEs 30A and 30C. In particular, PFE 30A requires multicast replication resources of PFE 30C to further DTR for fabric replication tree 37A, while PFE 30C requires multicast replication resources of PFE 30A to further DTR for fabric replication tree 37B. In conventional systems, such circular dependencies may lead to deadlock.

However, as illustrated in FIG. 6B and in accordance with the techniques described in this disclosure, each of PFEs 30 comprises multiple multicast virtual interfaces, each dedicated to a different level of fabric replication trees 37. Thus, for the next stage of the DTR process for fabric replication tree 37A, PFE 30C copies multicast traffic held in multicast virtual port $31C_1$ to multicast virtual port $31A_2$. Multicast virtual port $31A_2$ is designated to handle multicast traffic 50 for PFE 30A when PFE 30A corresponds to a child nodes occupying level 2 of fabric replication tree 37A. As a result, PFE 30C may satisfy a dependency upon PFE 30A even though multicast virtual port $31A_1$ is presently occupied by multicast traffic 52. Similarly, for the next stage of the DTR process for fabric replication tree 37B, PFE 30A copies multicast traffic held in multicast virtual port $31A_1$ to multicast virtual port $31C_2$.

Moreover, even in instances where, for example, multicast virtual port $31A_2$ is unavailable because it is presently occupied by multicast traffic, multicast virtual port $31A_2$ becomes available as it will most likely always drain packets to interfaces 34A associated with PFE 30A of exemplary router 6A. By performing the techniques exemplified in FIGS. 6A and 6B, example router 6A may avoid deadlock that results from a circular dependency among a plurality of DTR processes.

Various embodiments of the invention have been described. These and other embodiments are within the scope of the following claims.

What is claimed is:

1. A method comprising:
generating, by a network device, a multi-level replication data structure having a plurality of hierarchically-arranged nodes each associated with one of a plurality of packet replicators of the network device and each occupying one of a plurality of levels of the multi-level replication data structure, wherein each of the plurality of packet replicators of the network device comprises a plurality of packet buffer partitions for storing multicast packets;
by a packet replicator of the plurality of packet replicators that is associated with a node of the plurality of hierarchically-arranged nodes that occupies a level of the plurality of levels of the multi-level replication data structure, receiving a multicast packet; and
by the packet replicator, determining a packet buffer partition of the plurality of packet buffer partitions of the packet replicator that is associated with the level of the plurality of levels of the multi-level replication data structure and storing the multicast packet to the packet buffer partition prior to internally forwarding the multicast packet to a receiving packet replicator of the plurality of packet replicators in accordance with the multi-level replication data structure.

2. The method of claim 1, further comprising:
associating each level of the plurality of levels of the multi-level replication data structure with a corresponding packet buffer partition of the plurality of packet buffer partitions of the packet replicator,
wherein determining the packet buffer partition that is associated with the level of the plurality of levels of the multi-level replication data structure comprises determining the packet buffer partition based on the association.

3. The method of claim 1, further comprising:
associating the packet buffer partition with a multicast virtual interface of a plurality of multicast virtual interfaces of the packet replicator; and
by the packet replicator and with the multicast virtual interface, receiving the multicast packet,
wherein determining the packet buffer partition associated with the level of the plurality of levels of the multi-level replication data structure comprises mapping, based at least on the association of the packet buffer partition with the multicast virtual interface, the multicast virtual interface to the packet buffer partition.

4. The method of claim 1,
wherein the packet buffer partition comprises a first packet buffer partition of the packet replicator, and
wherein the node comprises a first node, the method further comprising:
by the packet replicator, reading the multicast packet from the packet buffer partition,
by the packet replicator, internally forwarding the multicast packet to the receiving packet replicator that is associated with a second node of the plurality of hierarchically-arranged nodes that occupies a next level of the plurality of levels of the multi-level replication data structure;
by the receiving packet replicator, receiving the internally forwarded multicast packet; and
by the receiving packet replicator, determining a second packet buffer partition of the plurality of packet buffer partitions of the receiving packet replicator that is associated with the next level of the plurality of levels of the multi-level replication data structure and storing the multicast packet to the second packet buffer partition.

5. The method of claim 1, further comprising:
by the packet replicator, sending a packet buffer partition access request to the receiving packet replicators, wherein the packet buffer partition access request indicates a packet buffer partition of the receiving packet replicator with which the receiving packet replicator shall store the multicast packet.

6. The method of claim 1, further comprising:

by the packet replicator, receiving a packet buffer partition access request wherein the packet buffer partition access request indicates the packet buffer partition that is associated with the level of the plurality of levels of the multi-level replication data structure;

by the packet replicator, determining whether the packet buffer partition is available to handle the multicast packet;

by the packet replicator and in response to determining the packet buffer partition is available to handle the multicast packet, granting the packet buffer partition access request to enable receipt of the multicast packet by the packet replicator.

7. The method of claim 1, wherein the multi-level replication data structure comprises a first multi-level replication data structure, the plurality of hierarchically-arranged nodes comprises a first plurality of hierarchically-arranged nodes, the packet buffer partition comprises a first packet buffer partition, and the multicast packet comprises a first multicast packet, the method further comprising:

generating, by a network device, a second multi-level replication data structure having a second plurality of hierarchically-arranged nodes each associated with one of the plurality of packet replicators of the network device and each occupying one of a plurality of levels of the second multi-level replication data structure;

associating each level of plurality of levels of the second multi-level replication data structure with a corresponding packet buffer partition of the plurality of packet buffer partitions of the packet replicator;

by the packet replicator that is associated with a node of the second plurality of hierarchically-arranged nodes that occupies a level of the plurality of levels of the second multi-level replication data structure that is different than the level of the plurality of levels of the first multi-level replication data structure, receiving a second multicast packet while the first multicast packet is stored to the first packet buffer partition; and by the packet replicator, determining a second packet buffer partition that is associated with the level of the plurality of levels of the second multi-level replication data structure and storing the multicast packet to the second packet buffer partition while the first multicast packet is stored to the first packet buffer partition.

8. The method of claim 1, wherein the packet replicator comprises an ingress packet replicator of the plurality of packet replicators and is associated with an ingress network interface of the network device for the multicast packet.

9. The method of claim 1, wherein each of the packet replicators comprises a packet forwarding engine.

10. The method of claim 1, further comprising:

generating, by the network device, a plurality of multi-level replication data structures each having nodes arranged in a plurality of levels that define an internal forwarding relationship among the nodes, wherein each node represents one of the plurality of packet replicators, wherein the multi-level replication data structure comprises a first multi-level replication data structure of the plurality of multi-level replication data structures; and generating, by the network device from the plurality of multi-level replication data structures, forwarding information that maps the plurality of levels of each of the plurality of multi-level replication data structures to respective partitions of the packet buffers of the plurality of packet replicators, wherein internally forwarding the multicast packet to a receiving packet replicator of the plurality of packet replicators in accordance with the multi-level replication data structure comprises internally forwarding, by the plurality of packet replicators according to the forwarding information, the multicast packet data.

11. A network device comprising:

a plurality of packet replicators interconnected by a switch fabric, wherein each of the plurality of packet replicators includes a plurality of packet buffer partitions each configured to store packets received by the network device;

a processor configured to generate a multi-level replication data structure having a plurality of hierarchically-arranged nodes each associated with one of the plurality of packet replicators of the network device and each occupying one of a plurality of levels of the multi-level replication data structure, wherein a packet replicator of the plurality of packet replicators that is associated with a node of the plurality of hierarchically-arranged nodes that occupies a level of the plurality of levels of the multi-level replication data structure is configured to receive a multicast packet; and wherein the packet replicator is configured to determine a packet buffer partition of the plurality of packet buffer partitions of the packet replicator that is associated with the level of the plurality of levels of the multi-level replication data structure and store the multicast packet to the packet buffer partition prior to internally forwarding the multicast packet to a receiving packet replicator of the plurality of packet replicators in accordance with the multi-level replication data structure.

12. The network device of claim 11, wherein the processor is configured to associate each level of the plurality of levels of the multi-level replication data structure with a corresponding packet buffer partition of plurality of packet buffer partitions of the packet replicator, and wherein to determine the packet buffer partition associated with the level of the plurality of levels of the multi-level replication data structure comprises the packet replicator is configured to determine the packet buffer partition based on the association.

13. The network device of claim 11, wherein the processor is configured to associate the packet buffer partition with a multicast virtual interface of a plurality of multicast virtual interfaces of the packet replicator, wherein the packet replicator is configured to receive the multicast packet with the multicast virtual interface, and wherein to determine the packet buffer partition associated with the level of the plurality of levels of the multi-level replication data structure, the packet replicator is configured to map, based at least on the association of the packet buffer partition with the multicast virtual interface, the multicast virtual interface to the packet buffer partition.

14. The network device of claim 11, wherein the packet buffer partition comprises a first packet buffer partition of the packet replicator, and the node comprises a first node, wherein the packet replicator is further configured to read the multicast packet from the packet buffer partition, wherein the packet replicator is further configured to internally forward the multicast packet to the receiving packet replicator that is associated with a second node of the plurality of hierarchically-arranged nodes that occupies a next level of the plurality of levels of the multi-level replication data structure, wherein the receiving packet replicator is configured to receive the internally forwarded multicast packet, and wherein the receiving packet replicator is configured to determine a second packet buffer partition of the plurality of packet buffer partitions of the receiving packet replicator that is associated with the next level of the plurality of levels of the multi-level replication data structure and storing the multicast packet to the second packet buffer partition.

15. The network device of claim 11, wherein the packet replicator is further configured to send a packet buffer partition access request to the receiving packet replicators, wherein the packet buffer partition access request indicates a packet buffer partition of the receiving packet replicator with which the receiving packet replicator shall store the multicast packet.

16. The network device of claim 11, wherein the packet replicator is further configured to receive a packet buffer partition access request wherein the packet buffer partition access request indicates the packet buffer partition that is associated with the level of the plurality of levels of the multi-level replication data structure, wherein the packet replicator is further configured to determine whether the packet buffer partition is available to handle the multicast packet;

wherein the packet replicator is further configured to, in response to determining the packet buffer partition is available to handle the multicast packet, grant the packet buffer partition access request to enable receipt of the multicast packet by the packet replicator.

17. The network device of claim 11, wherein the multi-level replication data structure comprises a first multi-level replication data structure, the plurality of hierarchically-arranged nodes comprises a first plurality of hierarchically-arranged nodes, the packet buffer partition comprises a first packet buffer partition, and the multicast packet comprises a first multicast packet, wherein the processor is configured to generate a second multi-level replication data structure having a second plurality of hierarchically-arranged nodes each associated with one of the plurality of packet replicators and each occupying one of a plurality of levels of the second multi-level replication data structure, wherein the processor is further configured to associate each level of plurality of levels of the second multi-level replication data structure with a corresponding packet buffer partition of the plurality of packet buffer partitions of the packet replicator, wherein the packet replicator is associated with a node of the second plurality of hierarchically-arranged nodes that occupies a level of the plurality of levels of the second multi-level replication data structure that is different than the level of the plurality of levels of the first multi-level replication data structure, wherein the packet replicator is configured to receive a second multicast packet while the first multicast packet is stored to the first packet buffer partition; and wherein the packet replicator is configured to determine a second packet buffer partition that is associated with the level of the plurality of levels of the second multi-level replication data structure and store the multicast packet to the second packet buffer partition while the first multicast packet is stored to the first packet buffer partition.

18. The network device of claim 11, further comprising:

a plurality of network interfaces, wherein the packet replicator comprises an ingress packet replicator of the plurality of packet replicators and is associated with an ingress network interface of the plurality of network interfaces for the multicast packet.

19. The network device of claim 11, wherein each of the packet replicators comprises a packet forwarding engine.

20. The network device of claim 11, wherein the processor is further configured to generate a plurality of multi-level replication data structures each having nodes arranged in a plurality of levels that define an internal forwarding relationship among the nodes, wherein each node represents one of the plurality of packet replicators, and wherein the multi-level replication data structure comprises a first multi-level replication data structure of the plurality of multi-level replication data structures, wherein the processor is further configured to generate, from the plurality of multi-level replication data structures, forwarding information that maps the plurality of levels of each of the plurality of multi-level replication data structures to respective partitions of the packet buffers of the plurality of packet replicators, wherein to internally forward the multicast packet to a receiving packet replicator of the plurality of packet replicators in accordance with the multi-level replication data structure the plurality of packet replicators are configured to internally forward, according to the forwarding information, the multicast packet data received by the network device.

21. A non-transitory computer-readable medium comprising instructions for causing one or more programmable processors of a network device to:

generate a multi-level replication data structure having a plurality of hierarchically-arranged nodes each associated with one of a plurality of packet replicators of the network device and each occupying one of a plurality of levels of the multi-level replication data structure, wherein each of the plurality of packet replicators of the network device comprises a plurality of packet buffer partitions for storing multicast packets;

by a packet replicator of the plurality of packet replicators that is associated with a node of the plurality of hierarchically-arranged nodes that occupies a level of the plurality of levels of the multi-level replication data structure, receive a multicast packet; and by the packet replicator, determine a packet buffer partition of the plurality of packet buffer partitions of the packet replicator that is associated with the level of the plurality of levels of the multi-level replication data structure and store the multicast packet to the packet buffer partition prior to internally forwarding the multicast packet to a receiving packet replicator of the plurality of packet replicators in accordance with the multi-level replication data structure.

22. The non-transitory computer-readable medium of claim 21, wherein the instructions further cause the one or more programmable processors of the network device to:

generate a plurality of multi-level replication data structures each having nodes arranged in a plurality of levels that define an internal forwarding relationship among the nodes, wherein each node represents one of the plurality of packet replicators, wherein the multi-level replication data structure comprises a first multi-level replication data structure of the plurality of multi-level replication data structures; and generate, from the plurality of multi-level replication data structures, forwarding information that maps the plurality of levels of each of the plurality of multi-level replication data structures to respective partitions of the packet buffers of the plurality of packet replicators, wherein internally forwarding the multicast packet to a receiving packet replicator of the plurality of packet replicators in accordance with the multi-level replication data structure comprises internally forwarding, by the plurality of packet replicators according to the forwarding information, the multicast packet data received by the network device.

* * * * *